United States Patent
Sakakibara et al.

(10) Patent No.: US 10,605,661 B2
(45) Date of Patent: Mar. 31, 2020

(54) IMAGE CAPTURING WITH FILTERS OF OVERLAPPING PASSBANDS

(71) Applicant: NIKON CORPORATION, Tokyo (JP)

(72) Inventors: Hiroshi Sakakibara, Yokohama (JP); Kiyoshige Shibazaki, Higashimurayama (JP); Junya Hagiwara, Chigasaki (JP); Yusuke Takanashi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/945,527

(22) Filed: Apr. 4, 2018

(65) Prior Publication Data
US 2018/0224333 A1 Aug. 9, 2018

Related U.S. Application Data

(63) Continuation of application No. PCT/JP2016/079506, filed on Oct. 4, 2016.

(30) Foreign Application Priority Data

Oct. 5, 2015 (JP) .................. 2015-197810

(51) Int. Cl.
*G01J 3/36* (2006.01)
*H04N 5/225* (2006.01)
(Continued)

(52) U.S. Cl.
CPC .............. *G01J 3/36* (2013.01); *G01J 3/2803* (2013.01); *G01J 3/2823* (2013.01); *G02B 5/201* (2013.01);
(Continued)

(58) Field of Classification Search
CPC .......... G01J 3/36; G01J 3/2803; G01J 3/2823; G01J 2003/2826; H04N 5/33;
(Continued)

(56) References Cited

U.S. PATENT DOCUMENTS

| | | | |
|---|---|---|---|
| 2004/0149915 A1* | 8/2004 | Goncalves | G01J 3/12 250/343 |
| 2008/0123097 A1* | 5/2008 | Muhammed | G01J 3/02 356/419 |
| 2009/0012405 A1 | 1/2009 | Hasegawa et al. | |

FOREIGN PATENT DOCUMENTS

| | | |
|---|---|---|
| JP | 2002-171519 | 6/2002 |
| JP | 2012-107942 | 6/2012 |

(Continued)

OTHER PUBLICATIONS

Written Opinion of the International Searching Authority dated Dec. 27, 2016 in corresponding International Patent Application No. PCT/JP2016/079506.

(Continued)

*Primary Examiner* — Hwa Andrew Lee

(57) ABSTRACT

An image capturing apparatus includes an image capturing device that captures an image of light from a subject, the light passing through each of wavelength band filters having invisible wavelengths as passbands, in which parts of the passbands of the filters whose center wavelengths are adjacent to each other mutually overlap, and a control unit that causes the image capturing device to capture an image of the light from the subject on which a first irradiation light is irradiated, the first irradiation light having a first spectral distribution in which parts of the respective passbands of the filters overlap with one another, and causes the image capturing device to capture an image of the light from the subject on which a second irradiation light is irradiated, the second irradiation light having a second spectral distribution in which parts of the respective passbands of the filters overlap with one another.

12 Claims, 20 Drawing Sheets

(51) Int. Cl.
  *G01J 3/28*    (2006.01)
  *H04N 5/33*    (2006.01)
  *G02B 5/20*    (2006.01)
  G02B 5/28      (2006.01)
(52) U.S. Cl.
  CPC ............. *G02B 5/208* (2013.01); *H04N 5/225* (2013.01); *H04N 5/2256* (2013.01); *H04N 5/332* (2013.01); *G01J 2003/2826* (2013.01); *G02B 5/281* (2013.01)
(58) Field of Classification Search
  CPC ........ H04N 5/2256; H04N 5/225; H04N 9/07; G02B 5/26; G02B 5/20
  See application file for complete search history.

(56) References Cited

FOREIGN PATENT DOCUMENTS

| | | |
|---|---|---|
| JP | 5034953 | 7/2012 |
| WO | WO2015/080275 A1 | 6/2015 |

OTHER PUBLICATIONS

International Search Report dated Dec. 27, 2016 in corresponding International Patent Application No. PCT/JP2016/079506.
International Preliminary Report on Patentability dated Apr. 10, 2018, in corresponding International Patent Application No. PCT/JP2016/079506, 8 pgs.

\* cited by examiner

IMAGE CAPTURING WITH FILTERS OF OVERLAPPING PASSBANDS

CROSS-REFERENCE TO RELATED APPLICATIONS

This application is a Continuation Application under 35 U.S.C. § 111(a) of PCT International Patent Application No. PCT/JP2016/079506, filed Oct. 4, 2016 which claims the foreign priority benefit to Japanese Patent Application No. 2015-197810 filed Oct. 5, 2015, the contents of which are incorporated herein by reference.

BACKGROUND

1. Technical Field

The present invention relates to an image capturing apparatus and an image capturing computer program product.

2. Related Art

A technology of splitting light into a plurality of bands within the near-infrared band and colorizing the light has been known (for example, refer to Patent Document 1).
[Patent Document 1] Japanese Patent Publication No. 5034953

To generate an image of a subject under an illumination within an invisible band in which no reference related to colors exists, and to convert this image of the subject into a visible color image, a plurality of spectral filters having band widths in passbands of the light of the invisible band are necessary. However, when capturing an image of a subject by using a spectral filter having a band width in the passband, information related to a spectrum of a luminous flux of the subject cannot be acquired with a high wavelength resolution.

SUMMARY

An image capturing apparatus in a first aspect of the present invention includes: an image capturing device that captures an image of light from a subject, the light passing through each of a plurality of wavelength band filters having invisible wavelengths as passbands, in which parts of the passbands of filters whose center wavelengths are closest to each other mutually overlap; and a control unit, such as a controller, a processor, etc., that causes the image capturing device to capture an image of the light from the subject on which a first irradiation light is irradiated, the first irradiation light having a first spectral distribution in which parts of the respective passbands of the plurality of wavelength band filters overlap with one another, and causes the image capturing device to capture an image of the light from the subject on which a second irradiation light is irradiated, the second irradiation light having a second spectral distribution which is different from the first spectral distribution and in which parts of the respective passbands of the plurality of wavelength band filters overlap with one another, where the first spectral distribution and the second spectral distribution are distributions that have no intensity in at least parts of the respective passbands of the plurality of wavelength band filters.

In a second aspect of the present invention, provided is a non-transitory image capturing computer program product having computer instructions, recorded on a computer readable medium, of an image capturing apparatus including an image capturing device that captures an image of light from a subject, the light passing through each of a plurality of wavelength band filters having invisible wavelengths as passbands, in which parts of the passbands of filters whose center wavelengths are closest to each other mutually overlap, where the image capturing computer program product enables a computer to execute the computer instructions to perform operations comprising: a first image capturing processing step of causing the image capturing device to capture an image of the light from the subject on which a first irradiation light is irradiated, the first irradiation light having a first spectral distribution in which parts of the respective passbands of the plurality of wavelength band filters overlap with one another; and a second image capturing processing step of causing the image capturing device to capture an image of the light from the subject on which a second irradiation light is irradiated, the second irradiation light having a second spectral distribution which is different from the first spectral distribution and in which parts of the respective passbands of the plurality of wavelength band filters overlap with one another.

An image capturing method in a third aspect of the present invention is an image capturing method of an image capturing apparatus that includes an image capturing device that captures an image of light from a subject, the light passing through each of a plurality of wavelength band filters having invisible wavelengths as passbands, in which parts of the passbands of filters whose center wavelengths are closest to each other mutually overlap, where the image capturing method includes: causing the image capturing device to capture an image of the light from the subject on which a first irradiation light is irradiated, the first irradiation light having a first spectral distribution in which parts of the respective passbands of the plurality of wavelength band filters overlap with one another; and causing the image capturing device to capture an image of the light from the subject on which a second irradiation light is irradiated, the second irradiation light having a second spectral distribution which is different from the first spectral distribution and in which parts of the respective passbands of the plurality of wavelength band filters overlap with one another, and where the first spectral distribution and the second spectral distribution are distributions that have no intensity in at least parts of the respective passbands of the plurality of wavelength band filters.

The above-described summary clause of the invention does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
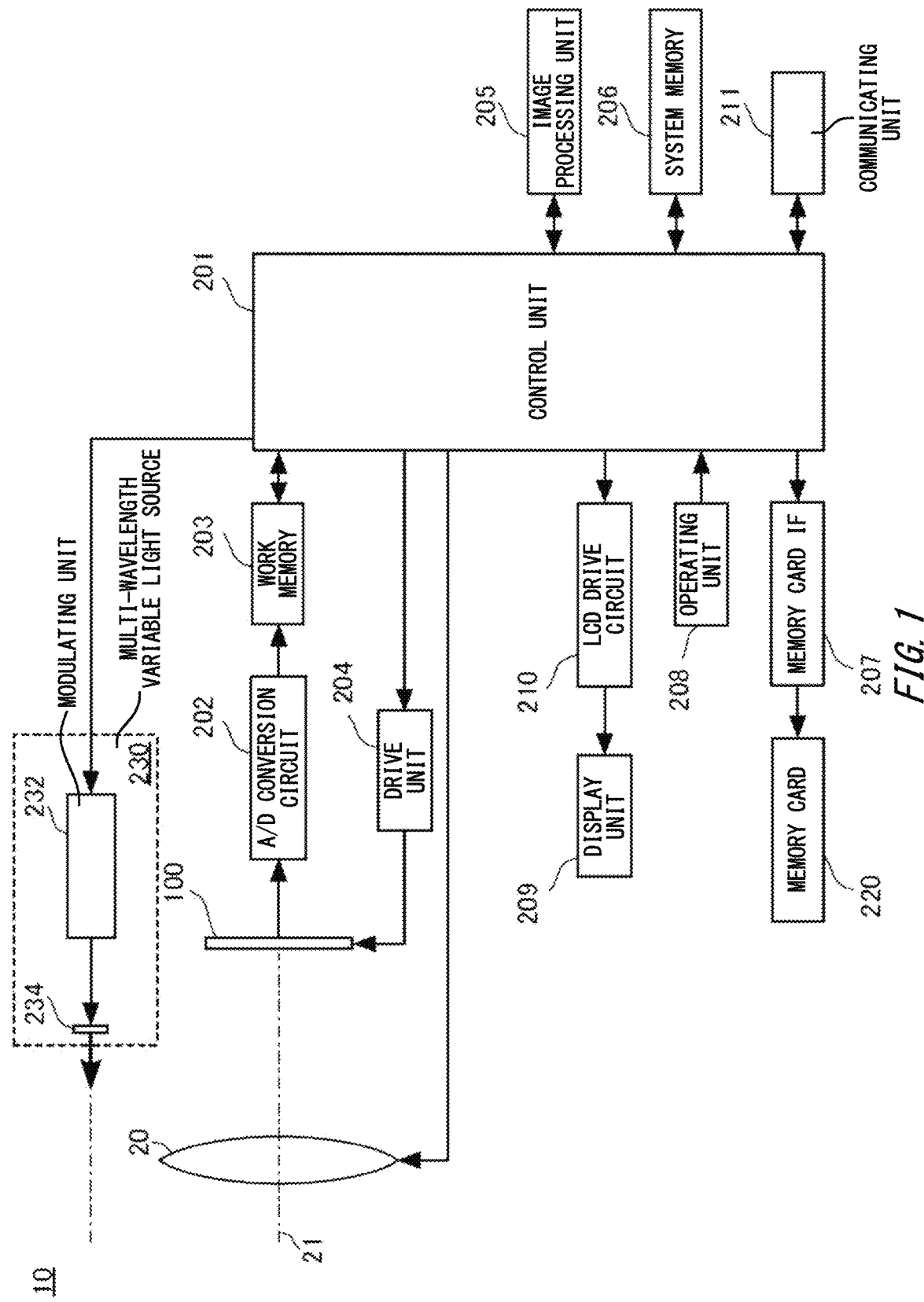
FIG. 1 is a drawing for describing a configuration of a digital camera in the present embodiment.

FIG. 1 is a drawing for describing a configuration of a digital camera in an embodiment of the present invention. A digital camera 10 is capable of capturing an image of a subject luminous flux of an invisible band. The digital camera 10 includes an image-capturing lens 20 as an imaging optical system, and an image capturing device 100. Also, the digital camera 10 includes a multi-wavelength variable light source 230 that emits light of the near-infrared band. The multi-wavelength variable light source 230 includes a modulating unit 232 and a light-emitting unit 234. As described below, the modulating unit 232 modulates a spectral distribution of light emitted from the light-emitting unit 234. Note that in the descriptions below, the spectral distribution of the light emitted from the light-emitting unit 234 may be referred to as a light emission spectrum. Irradiation light from the multi-wavelength variable light source 230 is emitted in a direction shown by an arrow from the light-emitting unit 234 and is irradiated on a subject.

The image capturing lens 20 guides, toward the image capturing device 100, the subject luminous flux that is incident along an optical axis 21 among the irradiation light reflected or scattered by the subject. Also, the digital camera 10 includes a control unit 201, an A/D conversion circuit 202, a work memory 203, a drive unit 204, an image processing unit 205, a system memory 206, a memory card IF 207, an operating unit 208, a display unit 209, a LCD drive circuit 210, and a communicating unit 211.

The image-capturing lens 20 is configured with a plurality of optical lens groups, and forms, near its focal plane, an image of the subject luminous flux from a scene. The image-capturing lens 20 may also be an interchangeable lens that can be attached to and detached from the digital camera 10. Note that in FIG. 1, for convenience of description, one piece of virtual lens that is arranged near a pupil is shown for representing the image-capturing lens 20.

The image capturing device 100 is arranged near a focal plane of the image-capturing lens 20. The image capturing device 100 is an image sensor for the infrared wavelength band having a light-receiving sensitivity in the invisible bands. In the present embodiment, as one example, the image capturing device 100 has the light-receiving sensitivity in a range between 800 nm and 2000 nm among a range being the near-infrared band between 800 nm and 2500 nm. Note that the ranges of the near-infrared band and of the light-receiving sensitivity are not limited to these ranges in the present example. For example, the near-infrared band may be widened, and a lower limit may also be set to 700 nm. Also, an upper limit of the near-infrared band may also be set to 3000 nm.

The image capturing device 100 includes a plurality of pixels arrayed two-dimensionally. Each of the plurality of pixels includes a photoelectric conversion unit, and a wavelength band filter provided corresponding to the photoelectric conversion unit. Any one of an NIR1 filter, an NIR2 filter, and an NIR3 filter, that are three wavelength band filters having invisible wavelengths as passbands, is provided to each photoelectric conversion unit of the image capturing device 100. Note that the wavelength band filter, also be referred to as a bandpass filter, is a filter having a band (width) in a wavelength and allows light to pass therethrough. Also, in the wavelength band filter, the passband of the wavelength through which the light passes (transmits) may be referred to as a transmission wavelength band. The details of the wavelength band filter in the present embodiment are described below by using the drawings.

The multi-wavelength variable light source 230 is a light source that can change a light emission spectrum in the near-infrared band. In the present embodiment, the multi-wavelength variable light source 230 emits light of the near-infrared band ranging from 800 nm to 2000 nm, for example. The multi-wavelength variable light source 230 includes a light-emitting element that emits light (corresponding to white light of the visible band) with continuous intensity in at least the wavelength band of the near-infrared band, a spectral element that demultiplexes the light emitted from the light-emitting element by wavelengths, and a modulating element that performs intensity modulation on the demultiplexed light by wavelengths. Next, the light on which the intensity modulation is performed by wavelengths is multiplexed through the spectral element again, and is emitted to the outside from the multi-wavelength variable light source 230. The multi-wavelength variable light source 230 can generate a desired light emission spectrum by adjusting, by the modulating element, the intensity of the light by wavelengths.

As described below in detail, the light emission spectrum of the multi-wavelength variable light source 230 has an approximately sine-wave shape in the wavelength region. The modulating unit 232 modulates the light emission spectrum characteristic of the multi-wavelength variable light source 230. Specifically, the modulating unit 232 modulates at least one of a spectral intensity, a phase, and a period. The multi-wavelength variable light source 230 switches a first irradiation light and a second irradiation light that have light emission spectrums different from each other to emit. Under control of the control unit 201, the multi-wavelength variable light source 230 functions as an irradiating unit.

The image capturing device 100 is driven by a drive unit 204 under timing control of the control unit 201, converts an image of the subject that is formed on a light-receiving plane into a pixel signal, and outputs the pixel signal to an A/D conversion circuit 202. The image capturing device 100 captures an image of the light from the subject on which the first irradiation light is irradiated, and outputs a pixel signal as a first output value to the A/D conversion circuit 202. Also, the image capturing device 100 captures an image of the light from the subject on which the second irradiation light is irradiated, and outputs a pixel signal as a second output value to the A/D conversion circuit 202. In the present embodiment, the image capturing device 100 is controlled so as to perform an image capturing processing respectively at timing when the first irradiation light is irradiated and timing when the second irradiation light is irradiated. The A/D conversion circuit 202 converts a pixel signal output by the image capturing device 100 into a digital signal. Next, first image data and second image data as image capturing data obtained by the digital conversion are output to the work memory 203. In the descriptions below, the image capturing data includes the first image data and the second image data.

As described above, each of the plurality of photoelectric conversion units is provided with any one of the three types of the bandpass filters. The above-described image capturing data includes an image capturing element obtained corresponding to the subject luminous flux passing through each of the three types of the bandpass filters. One specific example of the image capturing element is image layer data that is configured with pixel value data in a pixel on which the NIR1 filter is arranged. That is, in the present embodiment, the image capturing data includes three types of image layer data in accordance with respective transmission wavelength bands of the bandpass filters. Note that the image layer data is described below in detail.

The image processing unit 205 uses the work memory 203 as a workspace, and performs various processes such as a luminance correction process on the image capturing data. The image processing unit 205 extracts three pieces of the image layer data from the image capturing data formed by the photoelectric conversion of the image of the subject passing through each of the three wavelength band filters. Then, the image processing unit 205 performs a below-described interpolation process on each of the three pieces of the image layer data. The pieces of the image layer data on which the interpolation process has been performed are respectively associated with the corresponding bandpass filter and the irradiation light used for imaging, and are sequentially stored in the work memory 203.

Also, the image processing unit 205 serves as an analyzing unit under the control of the control unit 201. As described in detail below, the image processing unit 205 generates information (spectrum information) related to a spectrum feature amount of the subject by using the first image data and the second image data. The generation of the spectrum information of the subject is described below in detail.

The image processing unit 205 serves as an image generating unit under the control of the control unit 201. The image processing unit 205 generates visible image data on which various effect processes such as edge emphasis and color emphasis have been performed to emphatically display specified regions specified from the above-described spectrum information. Also, the image processing unit 205 records the generated visible image data in the memory card 220 that is mounted on the memory card IF 207.

Also, the visible image data generated as emphasized image data is converted into a display signal by a LCD drive circuit 210, and is displayed on the display unit 209. Note that on the display unit 209, menu screens for various settings are also displayed. For example, a menu screen related to a setting of the light emission spectrum of the irradiation light from the multi-wavelength variable light source 230 is displayed.

The system memory 206 records a program, various parameters, and the like to control the digital camera 10. In the present embodiment, the system memory 206 records respective pieces of spectral transmittance data of the three bandpass filters. In the spectral transmittance data, information of the peak wavelength of the transmittance or the transmittance of each wavelength is included. The spectral transmittance data may be recorded in a format of a function having the wavelength as a variable, or may also be recorded in a format of a data table showing a relation between the wavelength and the transmittance. Also, the spectral transmittance data is associated with identifiers of the respectively corresponding bandpass filters and is recorded.

The operating unit 208 receives an operation of a user. The operating unit 208 outputs, to the control unit 201, an operation signal in accordance with the received operation of the user. The operating unit 208 includes operation members such as a release switch, a cross key, and an OK key. The release switch is configured with a push button that can detect a push-down direction at two levels. The control unit 201 performs AF, AE, and the like that are image-capturing preparation operations according to a detection of SW1 being a first-level push-down, and performs an acquiring operation of the image of the subject by the image capturing device 100 according to a detection of SW2 being a second-level push-down. At this time, for a single image capturing operation, the digital camera 10 switches the first irradiation light and the second irradiation light, and performs the image capturing processing at the respective irradiation timings. Note that in the present embodiment, AF is performed so that the image of the subject is focused in the infrared wavelength band.

The communicating unit 211 communicates with other apparatuses. The communicating unit 211 sends, to the other apparatuses, the image capturing data in accordance with the operation of the user through the operating unit 208. As the other apparatuses, the followings may be included: an apparatus having a display unit, such as a personal computer, a smart phone, and a tablet terminal, a server apparatus on the Internet, and the like.

Figure 2:
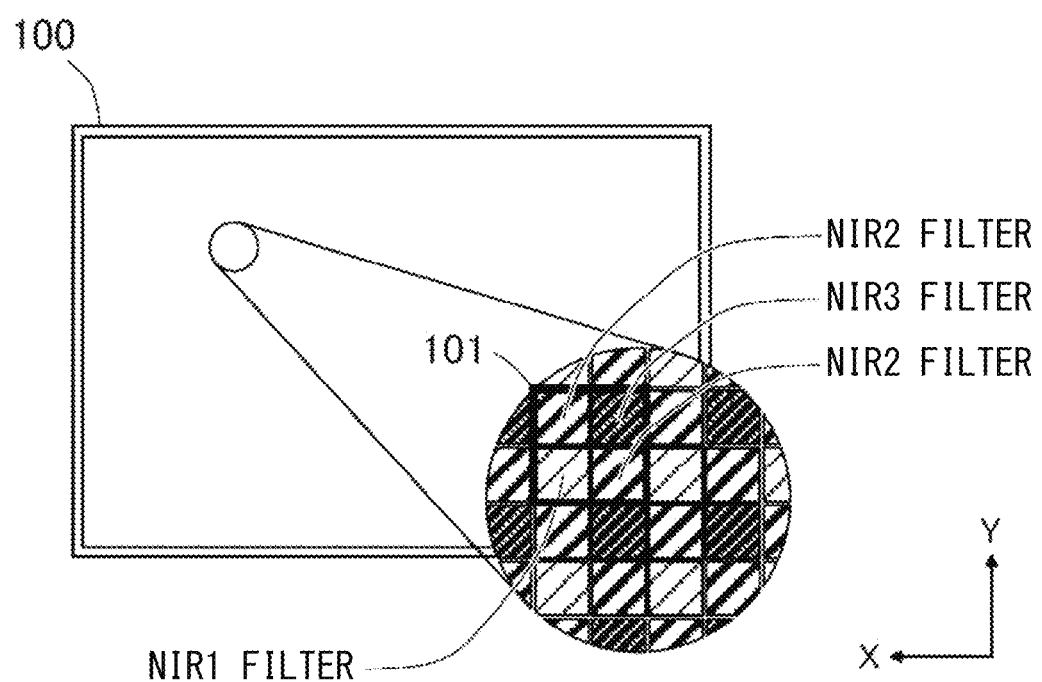
FIG. 2 is a drawing for describing a bandpass filter in the present embodiment.

FIG. 2 is a drawing for describing the bandpass filters in the present embodiment. Each of the three types of the bandpass filters has an invisible wavelength as the passband. In the present embodiment, the bandpass filters respectively have near-infrared wavelength bands as the passbands. The passbands of the three types of the bandpass filters are different from one another. As shown in the drawing, in the present embodiment, the NIR1 filter, NIR2 filter, and NIR3 filter are provided as the three types of the bandpass filters. As described below, the three types of the bandpass filters may simply be respectively referred to as NIR1, NIR2, and NIR3.

NIR1 to NIR3 are respectively allocated to a 4-pixel unit 101 that consists of 2 pixels×2 pixels (x×y). In FIG. 2, similar to a Bayer array in a visible band color filter, NIR2 is allocated to a pixel on the left side of the upper row and to a pixel on the right side of the lower row, NIR3 is allocated to a pixel on the right side of the upper row, and NIR1 is allocated to a pixel on the left side of the lower row, respectively. Note that the arrangement of the bandpass filters is not limited to the present example.

As the entire image capturing device 100, each of a plurality of the pixels, which are arrayed two-dimensionally, discretely includes any one of NIR1 to NIR3. Therefore, the image capturing device 100 separates an incident subject luminous flux into the respective wavelength bands for detection. In other words, the image capturing device 100 separates the image of the subject that is formed on a light-receiving plane into three wavelength bands, that are the infrared wavelength bands and that are different from one another to perform the photoelectric conversion.

The image processing unit 205 separates the image layer data configured with the pixel value data corresponding to the respective bandpass filters from the image capturing data. Specifically, the image processing unit 205 extracts, from the image capturing data, the image layer data including only the pixel value data of the pixel on which NIR1 is arranged. Similarly, for each of NIR2 and NIR3, the image processing unit 205 extracts the image layer data in a similar way. In this way, the image processing unit 205 extracts, from the image capturing data, three pieces of the image layer data respectively corresponding to the bandpass filters.

In the present embodiment, any one of the three bandpass filters is arranged on one pixel. Therefore, for example, in the image layer data in which only the pixel value data of the pixel on which NIR1 is arranged is extracted, the pixel value data is not stored over all pixels, and a pixel in which the pixel value data is not stored exists. In the descriptions below, the pixel in which the pixel value is not stored may be referred to as a defective pixel.

The image processing unit 205 calculates the pixel value of the defective pixel of each image layer data from the pixel values interpolation process of the neighboring pixels by, and generates the image layer data in which no defect of the pixel value data exists over all pixels. Specifically, for example, by using the pixel values of the neighboring pixels of the defective pixel that is the target of the interpolation process, the pixel value is calculated by bilinear interpolation or bi-cubic interpolation. Note that the interpolation processing method is not limited to these methods, and a known interpolation processing method may be adopted. In the descriptions below, when simply stating the image layer data, it indicates the image layer data after the above-described interpolation process unless otherwise stated. Also, in the descriptions below, image layer data generated by the first image data may be referred to as first image layer data, image layer data generated by the second image data may be referred to as second image layer data.

Figure 3:
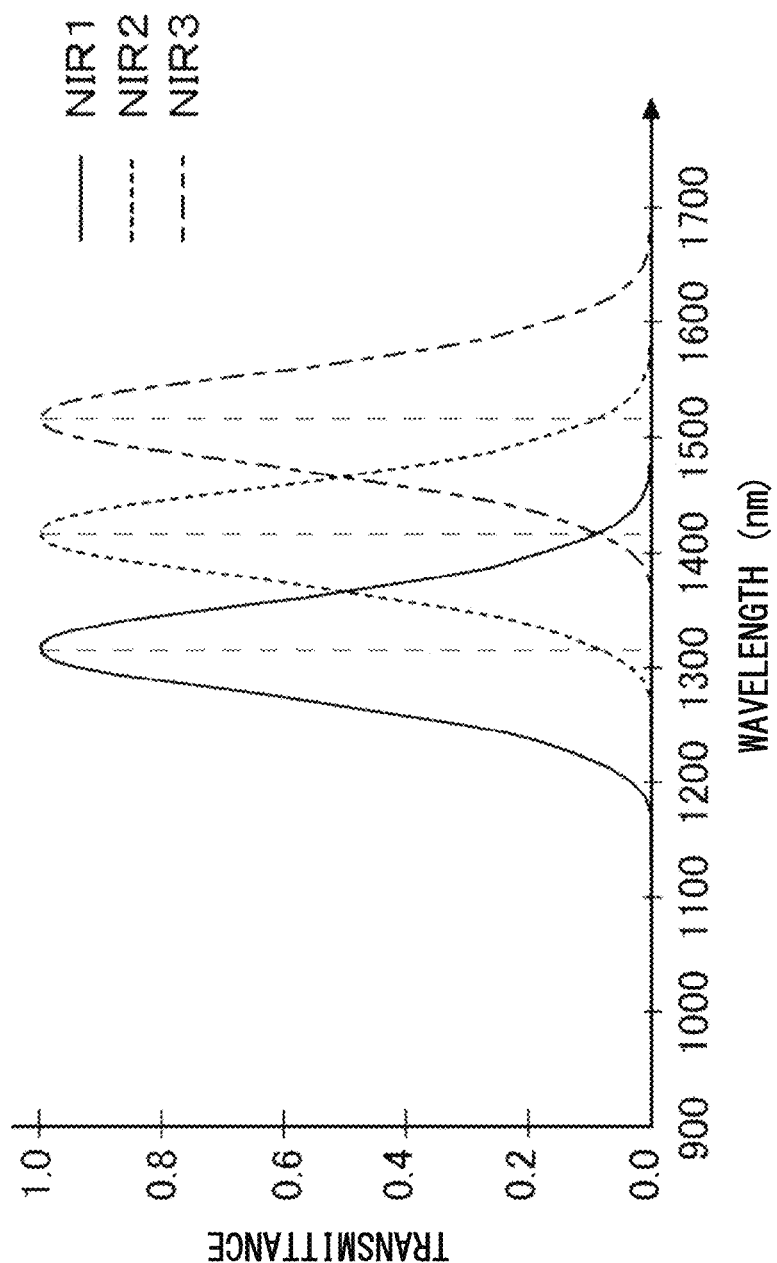
FIG. 3 is a drawing for describing a spectral transmittance characteristic of a bandpass filter in the present embodiment.

FIG. 3 is a drawing for describing spectral transmittance characteristics of the bandpass filters. Particularly, the drawing shows a spectral transmittance curve of each bandpass filter in the wavelength band between 900 nm and 1700 nm. The horizontal axis indicates the wavelength [nm], and the vertical axis indicates the transmittance [%]. As shown in FIG. 3, each of shapes of the spectral transmittance curves of NIR1 to NIR3 is approximately the same in whole. Also, in the present embodiment, the spectral transmittances of NIR1 to NIR3 are respectively unimodal distributions, and the center wavelengths of the transmission wavelength bands are substantially the same as the peak wavelengths of the transmittances. Further, among the plurality of these wavelength band filters, parts of the transmission wavelength bands of the wavelength band filters (NIR1 and NIR2, NIR2 and NIR3) whose center wavelengths (or peak wavelengths) are the closest to each other mutually overlap. In other words, if the spectral transmittance curves of the respective wavelength band filters are shown by a graph as FIG. 3, parts of the respective transmission wavelength bands of the wavelength band filters whose center wavelengths are adjacent to each other mutually overlap.

Note that the spectral transmittances are not limited to the unimodal ones and may be in various distributions. Even if the spectral transmittances are the unimodal distributions or other distributions other than the unimodal ones, the center wavelengths can be determined in accordance with shapes of the distributions. For example, a wavelength of a center of a width of the spectral transmittance curve of the transmittance that is 50% of the maximum transmittance, or a wavelength of a center of a width of the spectral transmittance curve of the transmittance of 50% may be taken as the center wavelength, or if the spectral transmittance curve is the unimodal distribution and has symmetry, the peak wavelength may be taken as the center wavelength as described above. Also, if the spectral transmittance curve is a multi-modal distribution, a fitting process may be performed on the spectral transmittance with a unimodal function such as a quadratic function or Gaussian function, and the peak wavelength of the transmittance curve obtained by the fitting process may be taken as the center wavelength. Furthermore, the center of the wavelength band having the transmittance may also be taken as the center wavelength. Note that if the center wavelength substantially represents the center of the distribution of the spectral transmittance, the center wavelength is not limited to the above-described definition.

More specifically, NIR1 has the transmittance between about 1170 nm and about 1450 nm, and the peak wavelength of the transmittance is 1310 nm. NIR2 has the transmittance between about 1270 nm and about 1550 nm, and the peak wavelength of the transmittance is 1410 nm. NIR3 has the transmittance between about 1370 nm and about 1650 nm, and the peak wavelength of the transmittance is 1510 nm.

Each of NIR1, NIR2, and NIR3 has the transmittance in the center wavelength that is the peak wavelength of the transmittance of the other adjacent bandpass filter(s). As specifically describing by using FIG. 3, NIR1 has the transmittance in the peak wavelength of NIR2. Similarly, NIR3 has the transmittance in the peak wavelength of NIR2. Also, NIR2 has the transmittance in each of the peak wavelengths of NIR1 and NIR3. Note that that having the transmittance indicates the transmittance of light is greater than 0. However, in a reality, the transmittance may not be 0 due to influences of manufacturing variation of the bandpass filters and the like. Accordingly, that having the transmittance may also indicate that the transmittance is equal to or more than a fine threshold, for example, greater than 0.05.

Figure 4:
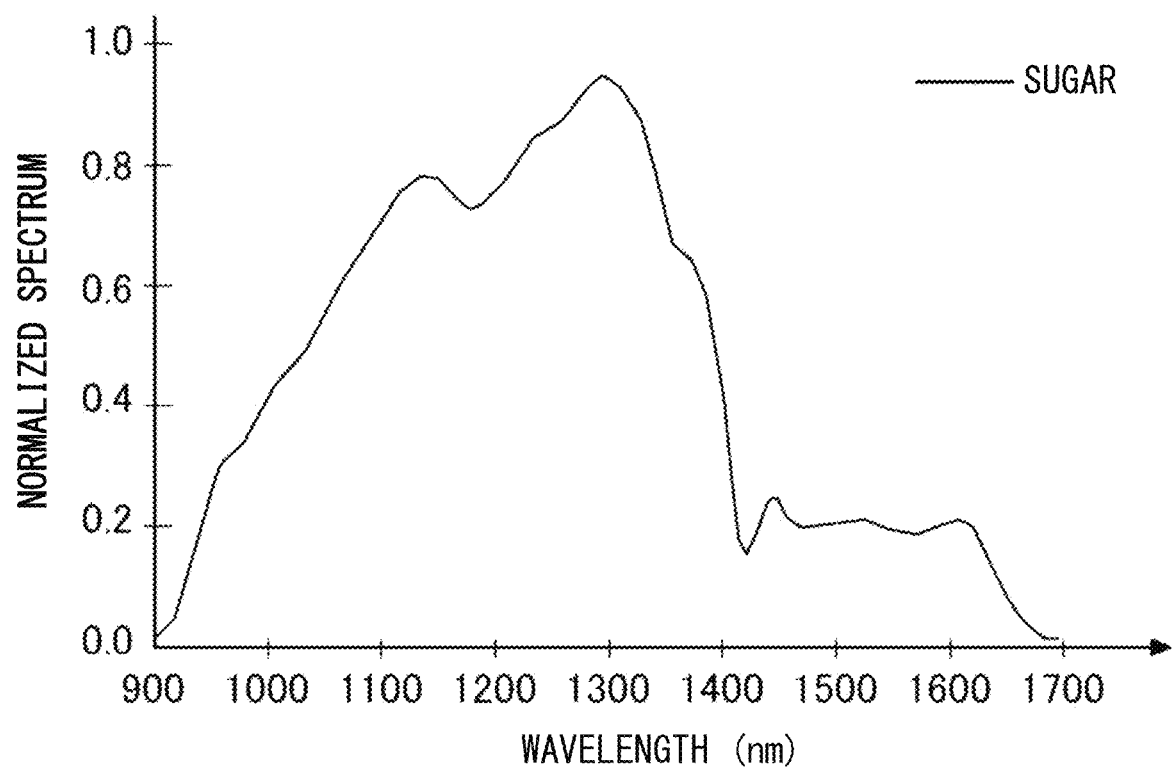
FIG. 4 is a drawing for describing a reflection spectrum characteristic of the near-infrared band of a subject.

FIG. 4 is a drawing for describing a reflection spectrum of the near-infrared band of a subject. The horizontal axis indicates the wavelength [nm], and the vertical axis indicates the normalized spectral intensity. In the descriptions below, the normalized spectral intensity may simply be referred to as spectral intensity. If a value of the spectral intensity is larger, light of the wavelength are reflected. On the other hand, if the value of the spectral intensity is smaller, the light of the wavelength are absorbed. In FIG. 4, particularly, sugar is an example as the subject, and the reflection spectrum in the wavelength band between 900 nm and 1700 nm is shown.

As shown in FIG. 4, sugar has wavelength dispersion in the reflectivity over the wavelength band in a wide range between 900 nm and 1700 nm. More specifically, the reflection spectrum of sugar has an absorption band in the vicinity of 900 nm and between the vicinity of 1400 nm and the vicinity of 1700 nm, and the reflectivity becomes lower. Particularly, from the vicinity of 900 nm to the vicinity of 1000 nm, and from the vicinity of 1300 nm to the vicinity of 1400 nm, the reflection spectrum of sugar has a steep gradient. The part having such a steep gradient shows a characteristic spectral shape having a large variation among the reflection spectrums of substances, and information related to the spectrum feature amount indicating this part is generated by an arithmetic processing that is described below.

The spectral intensity of sugar rises from about 0.01 to about 0.35 from the vicinity of 900 nm to the vicinity of 1000 nm. Also, the spectral intensity of sugar drops from about 1.0 to about 0.15 from the vicinity of 1300 nm to the vicinity of 1400 nm.

Figure 5:
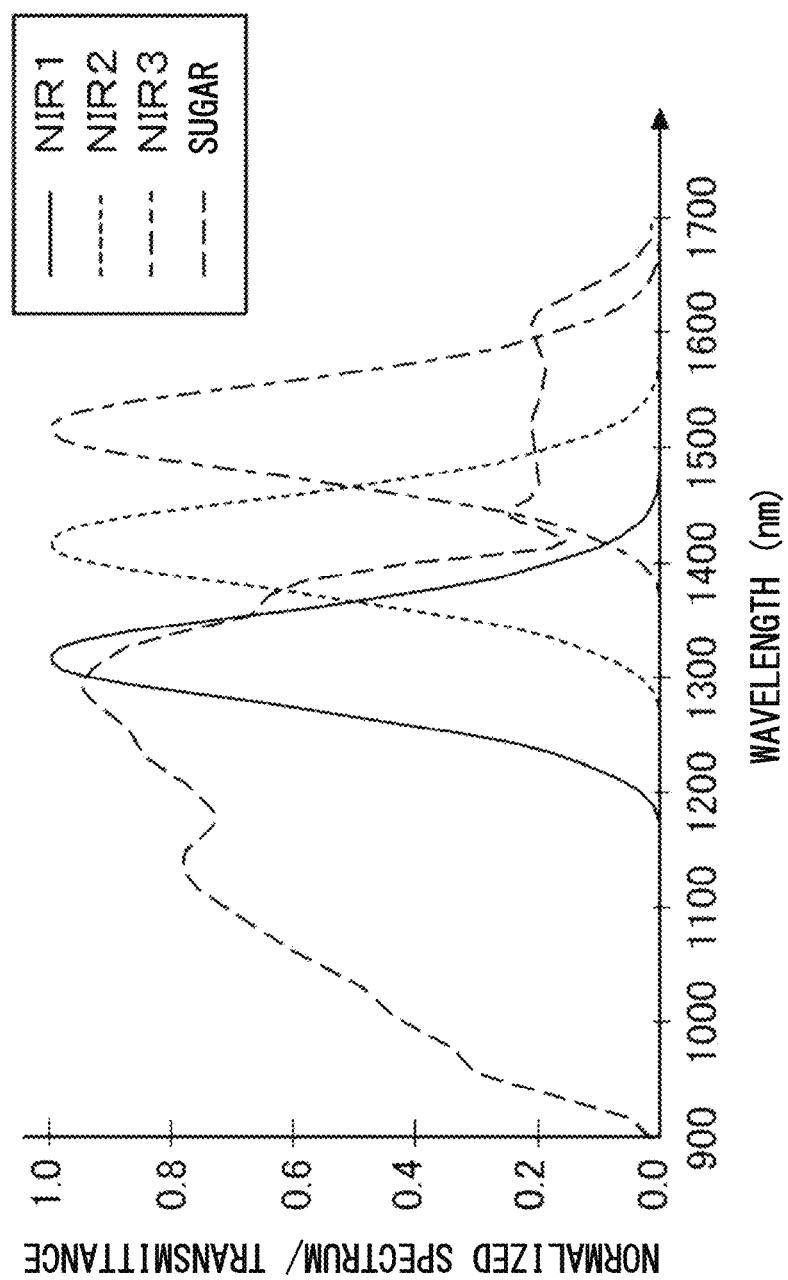
FIG. 5 is a drawing for describing a relation between a reflection spectrum of a subject and spectral transmittances of three types of bandpass filters.

FIG. 5 is a drawing for describing a relation between the reflection spectrum of the subject and the spectral transmittances of the three types of the bandpass filters. The horizontal axis indicates the wavelength [nm], and the vertical axis indicates the reflectivity and the transmittance. Note that similar to FIG. 4, sugar is the example as the subject, and the reflection spectrum is shown from 900 nm to 1700 nm.

The reflection spectrum of sugar shows a relatively high reflectivity over the transmission wavelength band of NIR1. Also, the reflection spectrum of sugar shows a relatively low reflectivity over the transmission wavelength band of NIR3. In the transmission wavelength band of NIR2, a wavelength band in which the reflection spectrum of sugar abruptly varies is included. In the transmission wavelength band of NIR2, the band having the relatively high reflectivity and the band having the relatively low reflectivity are included.

If it is assumed that the intensity of the irradiation light is fixed (=1.0) over the entire wavelengths, the intensity value of the light incident into the photoelectric conversion unit of the image capturing device 100 is a value obtained by integrating a product of the spectral transmittance of a corresponding bandpass filter and the reflectivity of the subject over the transmission wavelength band of the bandpass filter. For this reason, as shown in FIG. 5, if the wavelength band in which the spectrum of the subject varies is a fine band within the transmission wavelength band of the bandpass filter, the intensity variation cannot be detected. Therefore, in the visible image data finally generated, the variation of the spectrum is not reflected, and as a result, the image has a low discriminability for an observer.

Here, in the present embodiment, by using the multi-wavelength variable light source 230 that emits light having periodicity in the wavelength axial direction and illuminating with two types of irradiation light that has phases different from each other, the spectrum variation within the transmission wavelength band of the bandpass filter is detected. Also, by using the detection result, an image having good discriminability for the observer is generated.

FIG. 6 is a drawing for describing the light emission spectrum characteristic of the multi-wavelength light source in the present embodiment. The horizontal axis indicates the wavelength [nm], and the vertical axis indicates the normalized intensity. The multi-wavelength variable light source 230 in the present embodiment emits light having a light emission spectrum that has periodicity with respect to the wavelength. In other words, the multi-wavelength variable light source 230 emits the light having the light emission spectrum whose intensity oscillates in the wavelength axial direction. In the descriptions below, the oscillation period length of the intensity in the wavelength axial direction of the light emitted by the multi-wavelength variable light source 230 may be simply referred to as a wavelength period length, or the frequency in the wavelength axial direction may be simply referred to as a wavelength frequency, or the phase in the wavelength axial direction may be simply referred to as a phase.

The multi-wavelength variable light source 230 emits light that oscillates in a sine wave shape in the wavelength axial direction. Here, the light emission spectrum characteristic (spectral intensity I (λ)) of the light emitted from the multi-wavelength variable light source 230 is expressed by the following Equation 1.

$$I(\lambda)=I_0/2\times\{1+\sin(2\pi\lambda/\Lambda+\alpha)\} \qquad [\text{EQUATION 1}]$$

Here, $\lambda$ indicates the wavelength, $I_0$ indicates the maximum amplitude, $\Lambda$ indicates the wavelength period length, and $\alpha$ indicates an initial phase.

Figure 6A:
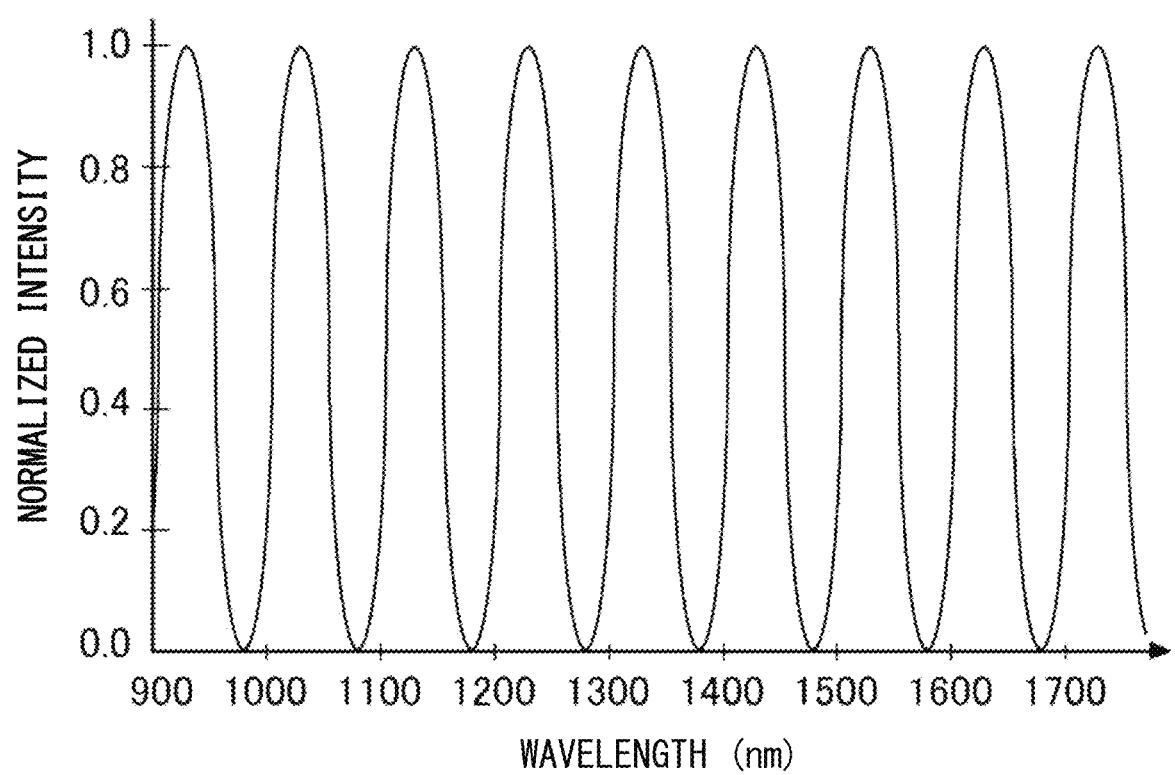
FIG. 6(a) and FIG. 6(b) are drawings respectively for describing a light emission spectrum characteristic of a multi-wavelength light source in the present embodiment.
Figure 6B:
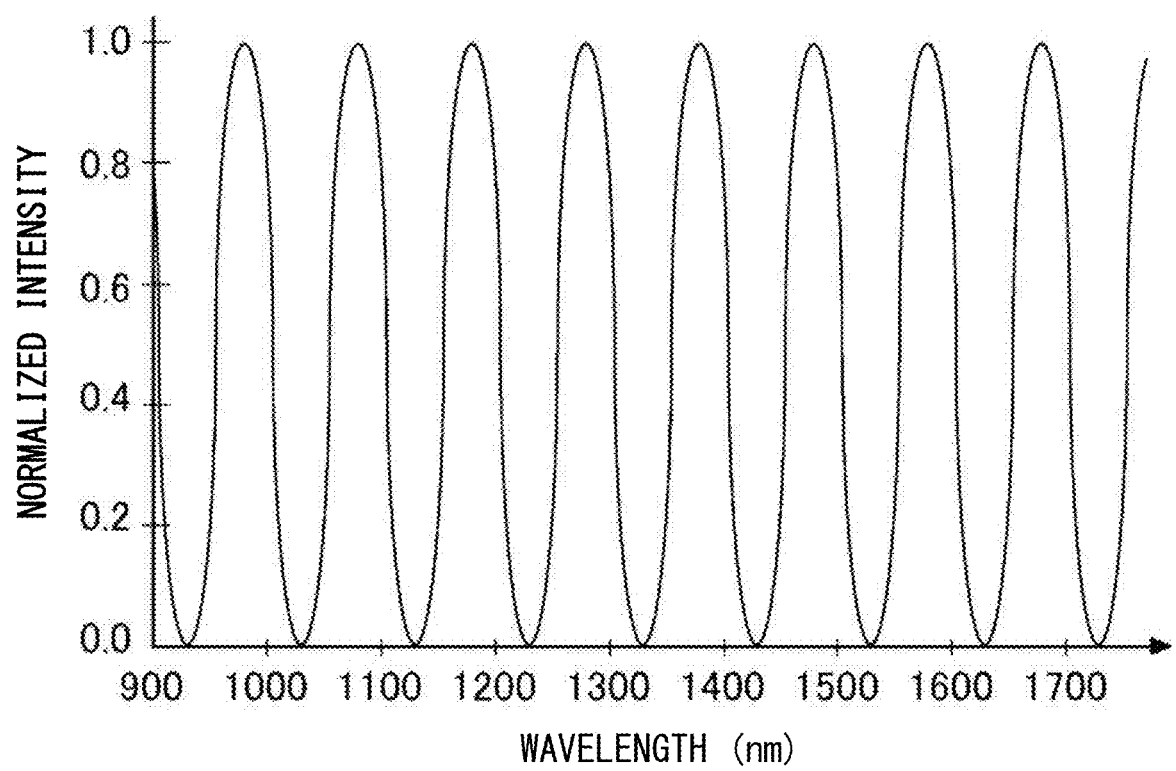

Under the control of the control unit 201, the modulating unit 232 can adjust at least one of the maximum amplitude $I_0$, the wavelength period length $\Lambda$, and the initial phase $\alpha$ of the emitted light. In the present embodiment, the modulating unit 232 modulates the initial phase $\alpha$. FIG. 6(a) shows one example of a first spectral distribution that is the light emission spectrum of the first irradiation light. Also, FIG. 6(b) shows one example of a second spectral distribution that is the light emission spectrum of the second irradiation light. The first spectral distribution and the second spectral distribution have the periodicity at least in parts of the respective transmission wavelength bands of the wavelength band filters. The first spectral distribution and the second spectral distribution shown in FIG. 6(a) and FIG. 6(b) respectively have the wavelength period lengths $\Lambda$ of 100 nm and respectively have the initial phases a that are shifted by π/2 from one another. Also, in the present embodiment, the first spectral distribution and the second spectral distribution have no intensity at least in parts of the respective transmission wavelength bands of the wavelength band filters. Here, that "have no intensity" includes a case where the light substantially has no intensity, in addition to a case where the intensity of the light is zero. In other words, in the irradiated light, the light of the wavelength of parts of the transmission wavelength band of the bandpass filter may not be substantially included. As described by using FIG. 6(a), the first spectral distribution has the intensity that is zero in the wavelengths of 980 nm, 1080 nm, 1180 nm, and the like, for example. That is, the first irradiation light does not include the light of these wavelengths. As shown in FIG. 6(a) and FIG. 6(b), the digital camera 10 in the present embodiment respectively irradiates, to a target object, the first irradiation light and the second irradiation light that have the light emission spectrum characteristics having phases different from each other.

Figure 7:
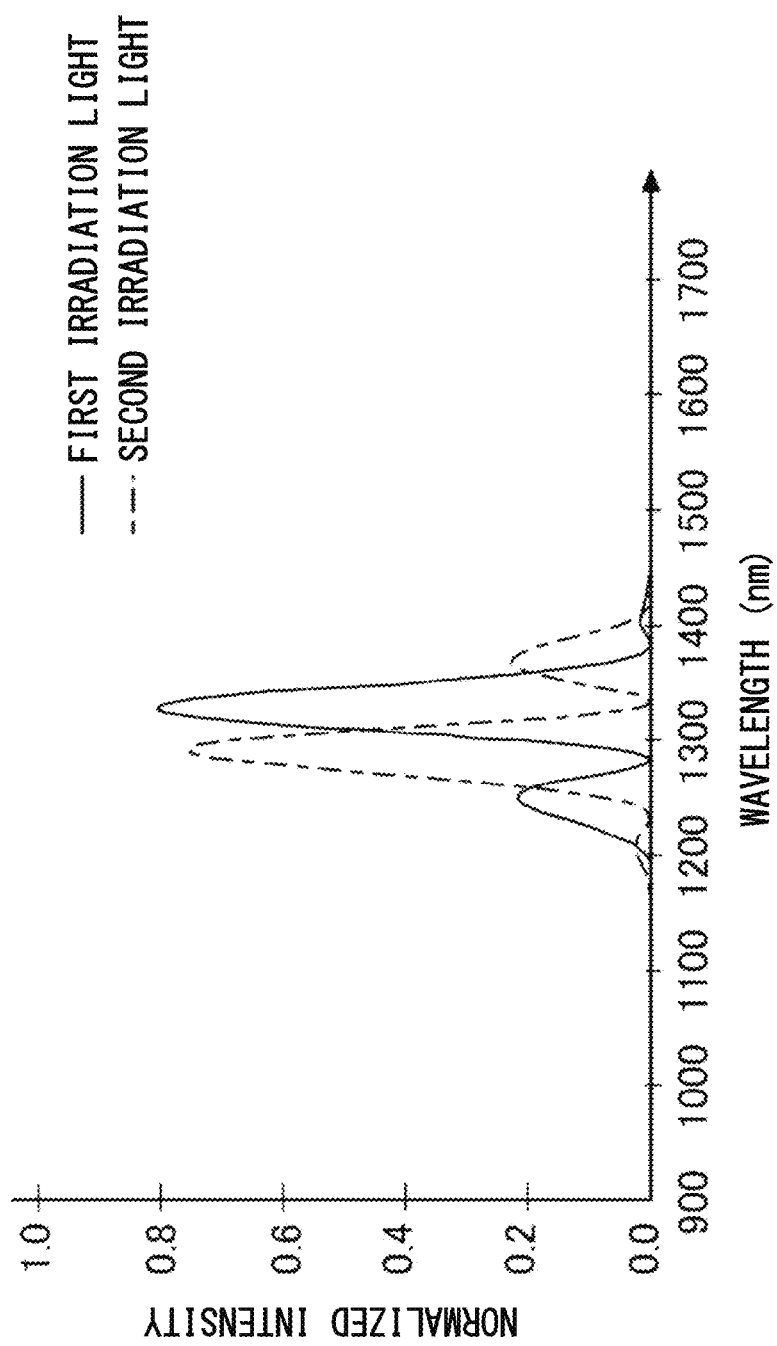
FIG. 7 is a drawing showing a spectrum when capturing an image of sugar through an NIR1 filter under each illumination of first irradiation light and second irradiation light.

FIG. 7 is a drawing showing a spectrum when capturing an image of sugar through NIR1 under each of the illuminations of the first irradiation light and the second irradiation light. The horizontal axis indicates the wavelength [nm], and the vertical axis indicates the normalized intensity of the irradiation light having the maximum intensity of 1.0. In FIG. 7, the spectrum represented by a solid line indicates the spectrum when capturing an image of sugar through NIR1 by irradiating the first irradiation light having the light emission spectrum characteristic shown in FIG. 6(a). Also, in FIG. 7, the spectrum represented by a short dash line indicates the spectrum when capturing an image of sugar through NIR1 by irradiating the second irradiation light having the light emission spectrum characteristic shown in FIG. 6(b). In the descriptions below, the spectrum obtained by the irradiation of the first irradiation light may be referred to as a first spectrum, and the spectrum obtained by the irradiation of the second irradiation light may be referred to as a second spectrum.

In FIG. 7, the first spectrum is a result obtained by multiplying the spectral transmittance of the NIR1 filter shown in FIG. 3, the light emission spectrum shown in FIG. 6(a), and the reflection spectrum of sugar shown in FIG. 4. Also, the second spectrum is a result obtained by multiplying the spectral transmittance of the NIR1 filter shown in FIG. 3, the light emission spectrum shown in FIG. 6(b), and the reflection spectrum of sugar shown in FIG. 4. Note that for ease of description, the spectral sensitivity characteristic of the image capturing device 100 is set to 1.0 in all wavelength bands.

In FIG. 7, the first spectrum respectively has a peak of about 0.2 in the vicinity of 1250 nm and a peak of about 0.8 in the vicinity of 1330 nm. On the other hand, the second spectrum respectively has a peak of about 0.75 in the vicinity of 1300 nm and a peak of about 0.2 in the vicinity of 1370 nm.

Figure 8:
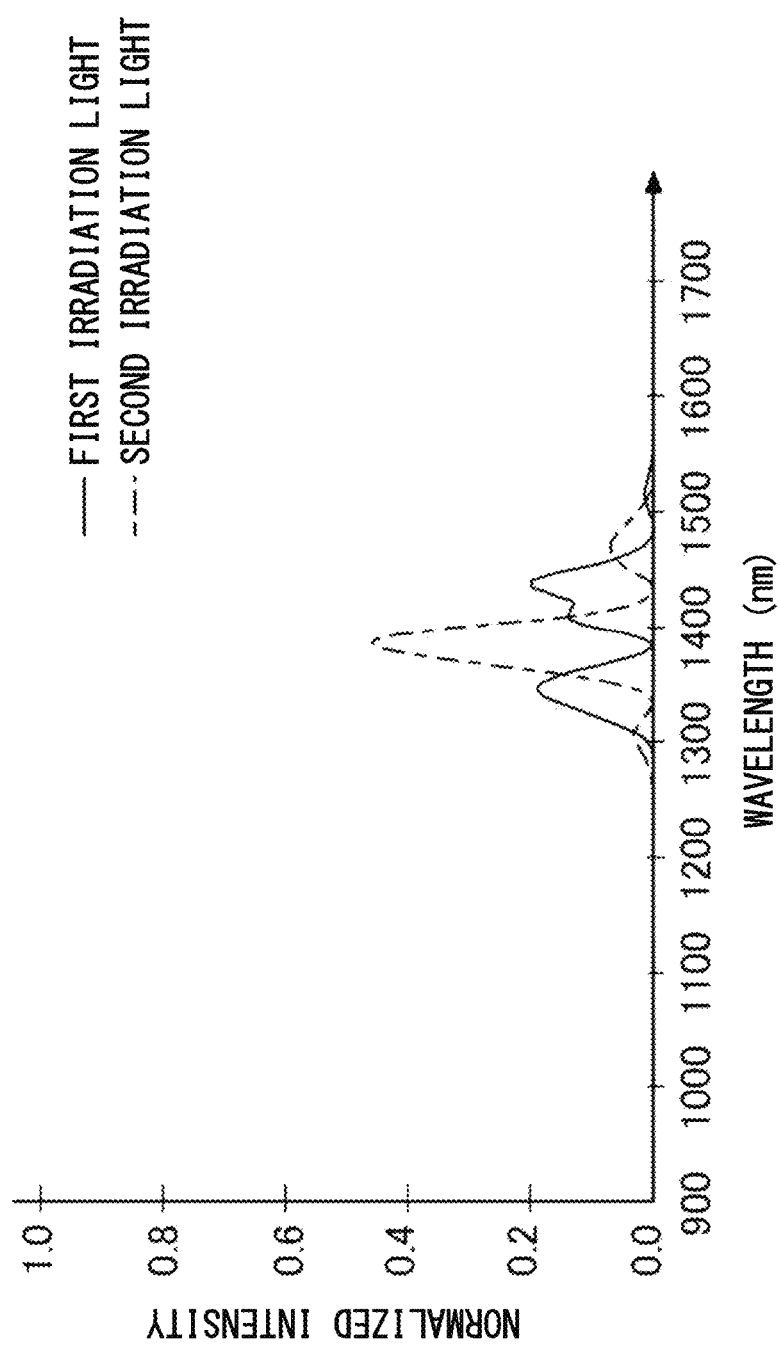
FIG. 8 is a drawing showing a spectrum when capturing an image of sugar through a NIR2 filter under each illumination of the first irradiation light and the second irradiation light.

FIG. 8 is a drawing showing the spectrum when capturing an image of sugar through the NIR2 filter under each illumination of the first irradiation light and the second irradiation light. The horizontal axis indicates the wavelength [nm], and the vertical axis indicates the normalized intensity of the irradiation light having the maximum intensity of 1.0. Also, in FIG. 8, the first spectrum is represented by the solid line and the second spectrum is represented by the short dash line.

In FIG. 8, the first spectrum is a result obtained by multiplying the spectral transmittance of the NIR2 filter shown in FIG. 3, the light emission spectrum shown in FIG. 6(a), and the reflection spectrum of sugar shown in FIG. 4. Also, the second spectrum is a result obtained by multiplying the spectral transmittance of the NIR2 filter shown in FIG. 3, the light emission spectrum shown in FIG. 6(b), and the reflection spectrum of sugar shown in FIG. 4. Note that for ease of description, the spectral sensitivity characteristic of the image capturing device 100 is set to 1.0 in all wavelength bands.

In FIG. 8, the first spectrum respectively has a peak of about 0.2 in the vicinity of 1350 nm, a peak of about 0.13 in the vicinity of 1420 nm, and a peak of about 0.2 in the vicinity of 1440 nm. On the other hand, the second spectrum respectively has a peak of about 0.43 in the vicinity of 1380 nm, and a peak of about 0.07 in the vicinity of 1470 nm.

Figure 9:
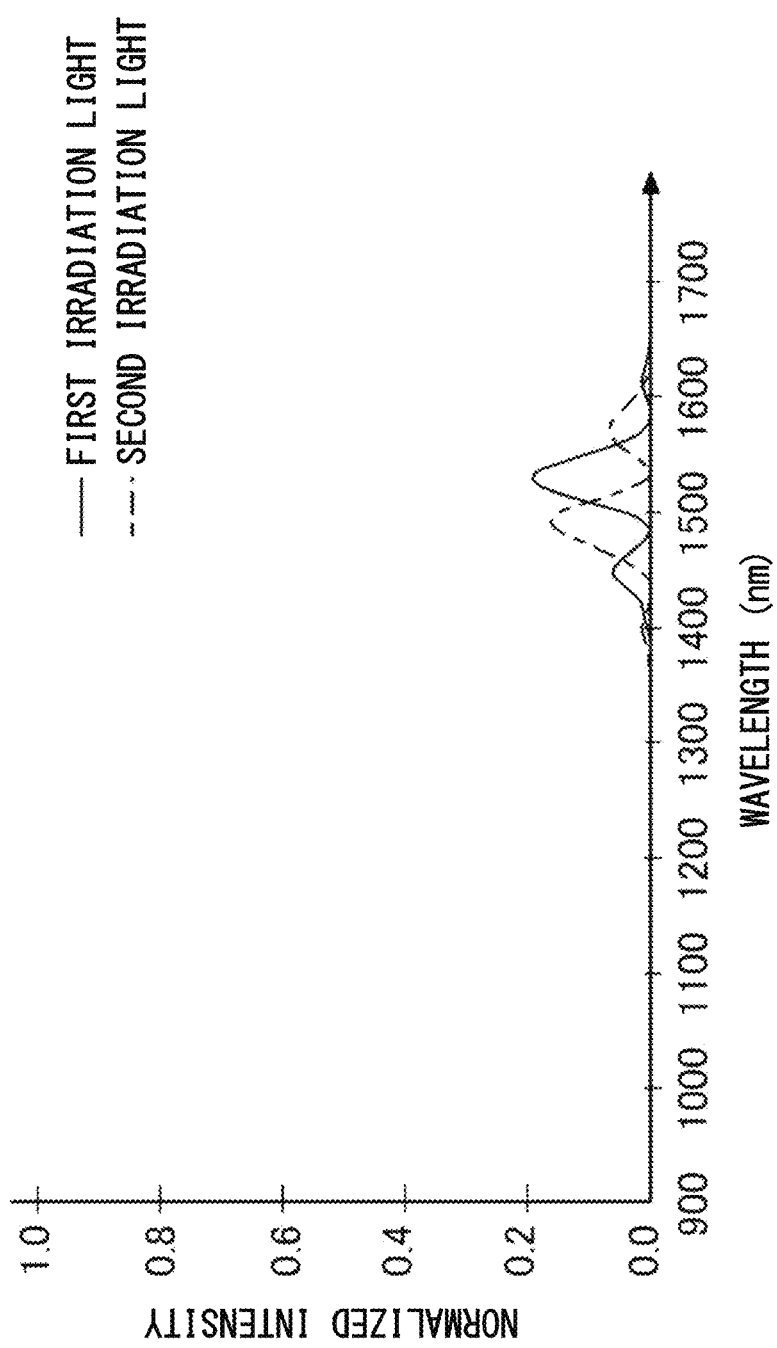
FIG. 9 is a drawing showing a spectrum when capturing an image of sugar through a NIR3 filter under each illumination of the first irradiation light and the second irradiation light.

FIG. 9 is a drawing showing the spectrum when capturing an image of sugar through the NIR3 filter under each illumination of the first irradiation light and the second irradiation light. The horizontal axis indicates the wavelength [nm], and the vertical axis indicates the normalized intensity of the incident light having the maximum intensity of 1.0. Also, in FIG. 9, the first spectrum is represented by the solid line and the second spectrum is represented by the short dash line.

In FIG. 9, the first spectrum is a result obtained by multiplying the spectral transmittance of the NIR3 filter shown in FIG. 3, the light emission spectrum shown in FIG. 6(a), and the reflection spectrum of sugar shown in FIG. 4. Also, the second spectrum is a result obtained by multiplying the spectral transmittance of the NIR3 filter shown in FIG. 3, the light emission spectrum shown in FIG. 6(b), and the reflection spectrum of sugar shown in FIG. 4. Note that for ease of description, the spectral sensitivity characteristic of the image capturing device 100 is set to 1.0 in all wavelength bands.

In FIG. 9, the first spectrum respectively has a peak of about 0.06 in the vicinity of 1450 nm and a peak of about 0.2 in the vicinity of 1530 nm. On the other hand, the second spectrum respectively has a peak of about 0.16 in the vicinity of 1490 nm and a peak of about 0.06 in the vicinity of 1570 nm.

As described by using FIG. 7 to FIG. 9, in NIR1 and NIR3, a difference of the integral values of the intensity between the first spectrum and the second spectrum is relatively small. On the other hand, in NIR2, a difference of the integral values of the intensity between the first spectrum and the second spectrum is relatively large. In this way, the variation of the reflection spectrum within the transmission wavelength bands of the bandpass filters can be detected from the difference of the integral values between the spectrum when the first irradiation light is irradiated and the spectrum when the second irradiation light is irradiated.

Figure 10A:
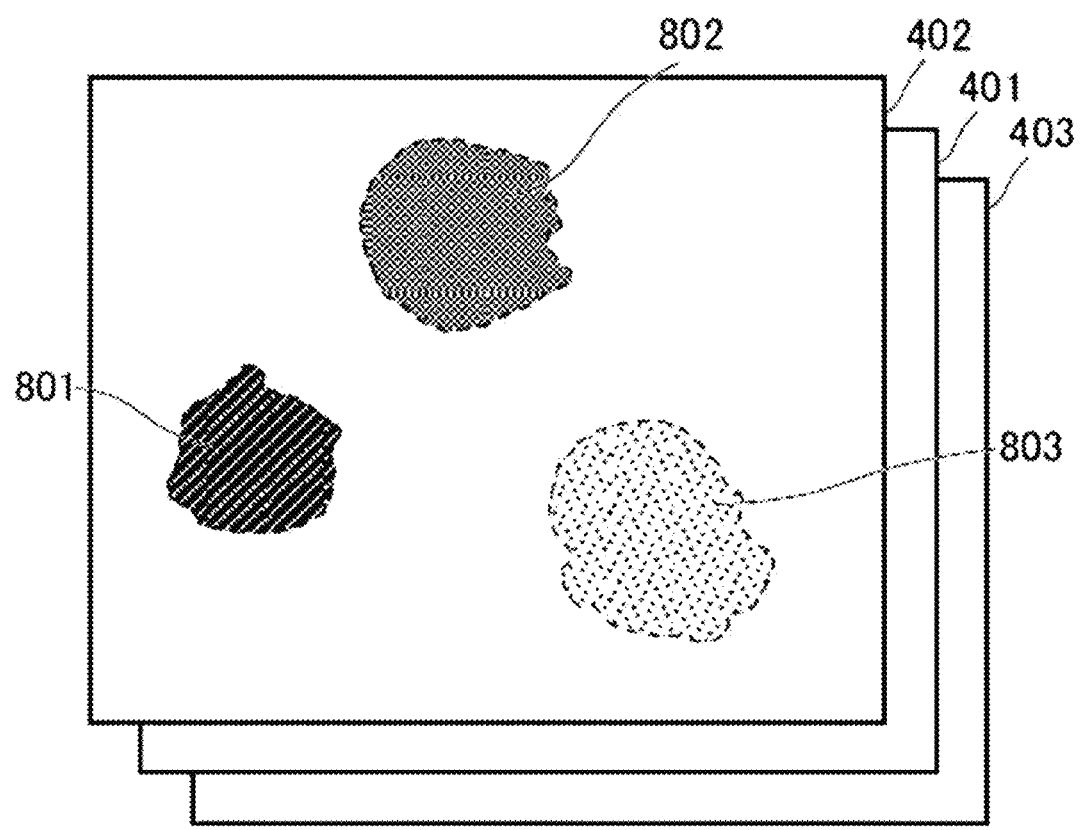
FIG. 10(a) and FIG. 10(b) are respective schematic diagrams of a first image layer data and a second image layer data of each bandpass filter.
Figure 10B:
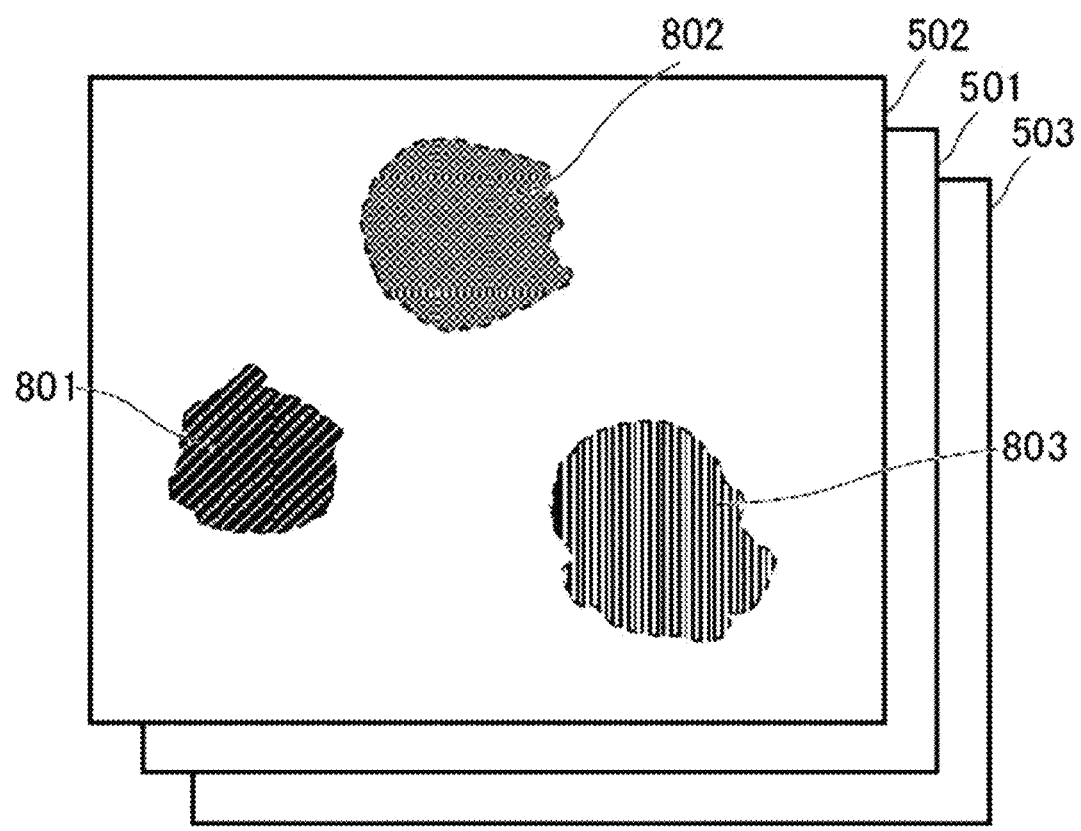

FIG. 10(a) and FIG. 10(b) are schematic diagrams of the first image layer data and the second image layer data of each bandpass filter. FIG. 10(a) shows the first image layer data, and FIG. 10(b) shows the second image layer data, respectively. A region 801 is a data region including an image region of "salt". A region 802 is a data region including an image region of "synthetic sweetener". A region 803 is a data region including an image region of "sugar".

FIG. 10(a) shows first image layer data 401, first image layer data 402, and first image layer data 403. The first image layer data 401 is the first image layer data corresponding to NIR1. The first image layer data 402 is the first image layer data corresponding to NIR2. The first image layer data 403 is the first image layer data corresponding to NIR3.

FIG. 10(b) shows second image layer data 501, second image layer data 502, and second image layer data 503. The second image layer data 501 is the second image layer data corresponding NIR1. The second image layer data 502 is the second image layer data corresponding to NIR2. The second image layer data 503 is the second image layer data corresponding to NIR3.

When paying attention to the region 801 and the region 802 in FIG. 10(a) and FIG. 10(b), the same hatchings are respectively used in the first image layer data 402 and the second image layer data 502. This shows that there is no significant difference present in the pixel values in the region 801 and the region 802 between the case where the first irradiation light is irradiated and the case where the second illumination light is irradiated.

On the other hand, when paying attention to the region 803, the hatchings different from each other are used in the first image layer data 402 and the second image layer data 502. This shows that there is a difference present in the pixel values in the region 803 between the case where the first irradiation light is irradiated and the case where the second illumination light is irradiated.

Figure 11A:
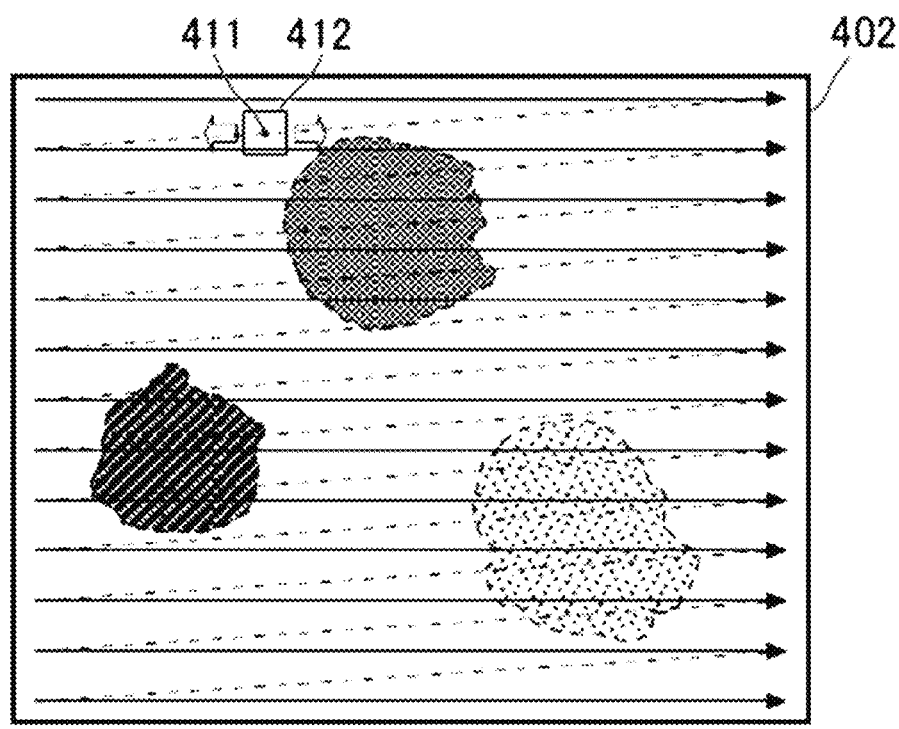
FIG. 11(a) and FIG. 11(b) are explanatory drawings respectively for describing an extraction processing in specified regions between the first image layer data and the second image layer data.
Figure 11B:
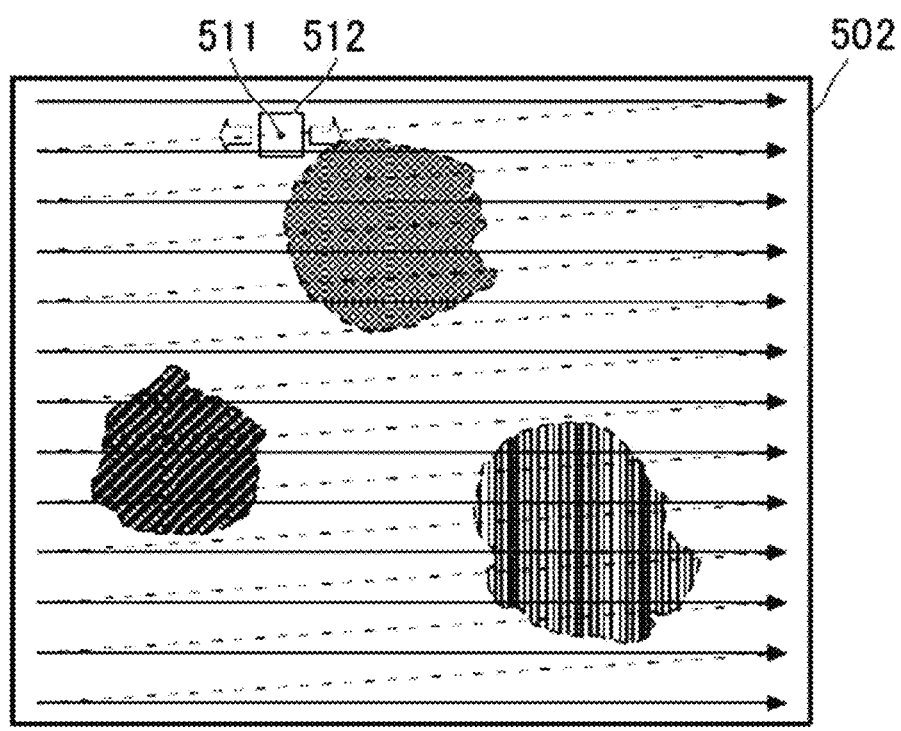

FIG. 11(a) and FIG. 11(b) are explanatory drawings respectively for describing the extraction processing on the specified regions between the first image layer data and the second image layer data. Particularly, FIG. 11(a) and FIG. 11(b) show the process of extracting the specified regions in the first image layer data 402 and the second image layer data 502 described by using FIG. 10(a) and FIG. 10(b). The image processing unit 205 performs the extraction processing of the following specified regions on the first image layer data 402 and the second image layer data 502.

The image processing unit 205 sets local windows 412, 512. The local windows 412, 512 are regions that respectively have center pixels 411, 511 as centers and, for example, are square regions by 5×5 pixels.

The image processing unit 205 calculates the integrated value of the pixel values within the local window 412 while causing the local window 412 to scan on all regions on the first image layer data 402 along the arrow direction in order from the upper left end to the lower right end of the first image layer data 402. In the descriptions below, the integrated value of the pixel values within the local window may be referred to as an integrated pixel value. Every time when the integrated pixel value is calculated, the image processing unit 205 associates the integrated pixel value with a coordinate position of the center pixel 411 and stores the integrated pixel value in the system memory 206. In the descriptions below, the coordinate may be referred to as detection coordinate.

Similarly, the image processing unit 205 calculates the integrated value of the pixel values within the local window 512 while causing the local window 512 to scan on all regions on the second image layer data 502 along the arrow direction in order from the upper left end to the lower right end of the second image layer data 502. Every time when the integrated pixel value is calculated, the image processing unit 205 associates the integrated pixel value with the coordinate position of the center pixel 511 and stores the integrated pixel value in the system memory 206. Note that the image processing unit 205 also performs a similar process on the image layer data corresponding to NIR1 and NIR3.

Figure 12:
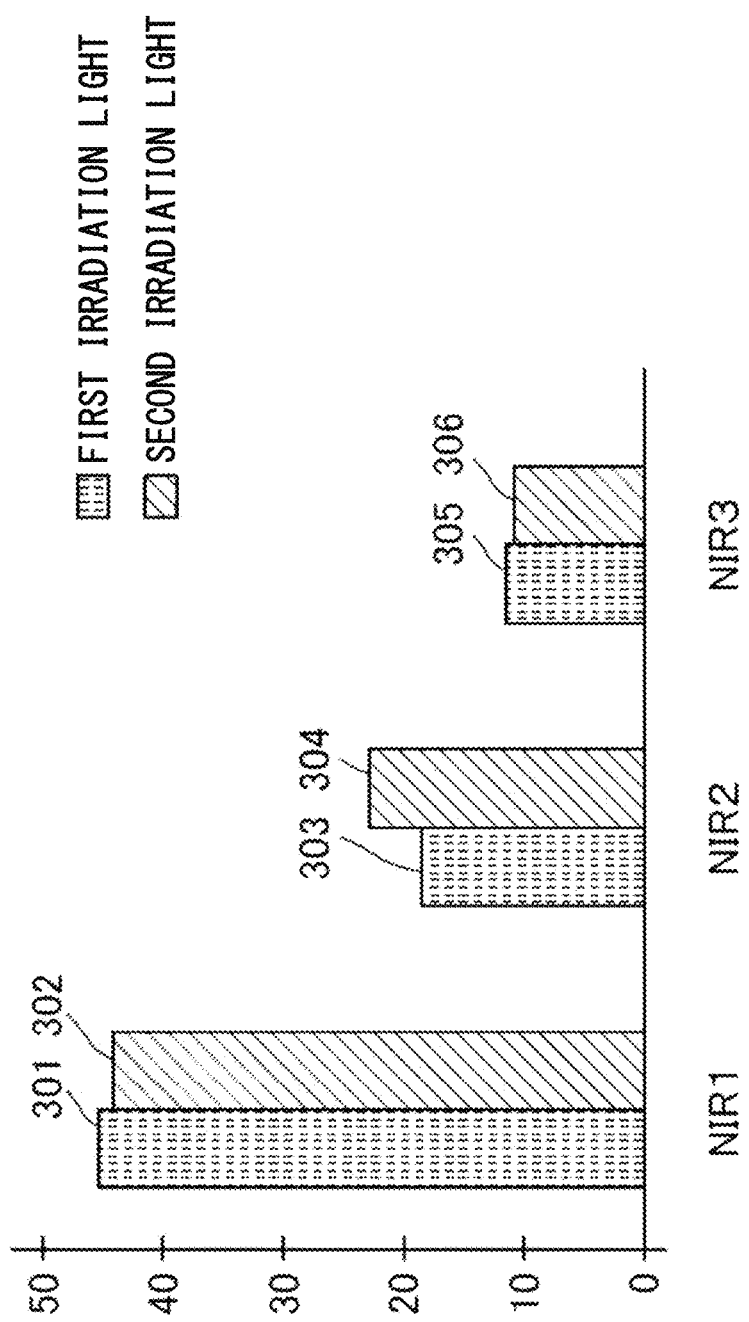
FIG. 12 is a drawing showing, by a bar graph, integral values of pixel values within a local window of a captured image for each irradiation light and each bandpass filter.

FIG. 12 is a drawing showing, by a bar graph, the integrated value of the pixel values within some local window included within the region 803 of the image layer data for each irradiation light and each bandpass filter. Particularly, FIG. 12 is a graph of the integrated pixel value in some detection coordinate position described by using FIG. 11(a) and FIG. 11(b). The horizontal axis indicates the type of the bandpass filter, and the vertical axis indicates the integrated pixel value.

In FIG. 12, the integrated pixel value decreases from NIR1 toward NIR3. Because the received light amount received by the photoelectric conversion unit has a proportional relation with the pixel value, it can be known that in a partial region of an analysis target, the received light amount of the transmission wavelength band of NIR3 is smaller than the received light amount of the transmission wavelength band of NIR1. This shows that the reflectivity of the substance included in the local window in the transmission wavelength band of NIR3 is lower than that in the transmission wavelength band of NIR1.

Further, the integrated pixel value under the illumination of the first irradiation light is compared to that under the illumination of the second irradiation light. In FIG. 12, the integrated pixel value graph 301 and the integrated pixel value graph 302 show the integrated pixel values within the local window in the image layer data corresponding to NIR1 filter. The integrated pixel value graph 301 shows the integrated pixel value of the first image layer data. On the other hand, the integrated pixel value graph 302 shows the integrated pixel value of the second image layer data.

According to the integrated pixel value graph 301, the integrated pixel value under the illumination of the first irradiation light is about 45. On the other hand, according to the integrated pixel value graph 302, the integrated pixel value under the illumination of the second irradiation light represents about 44. Therefore, the difference between the integrated pixel values of the partial regions under the illuminations of the first irradiation light and the second irradiation light is about 1.

In FIG. 12, the integrated pixel value graph 303 and the integrated pixel value graph 304 show the integrated pixel value within the local window in the image layer data corresponding to the NIR2 filter. The integrated pixel value graph 303 shows the integrated pixel value of the first image layer data. On the other hand, the integrated pixel value graph 304 shows the integrated pixel value of the second image layer data.

According to the integrated pixel value graph 303, the integrated pixel value under the illumination of the first irradiation light is about 18. On the other hand, according to the integrated pixel value graph 304, the integrated pixel value under the illumination of the second irradiation light is about 22. Therefore, the difference between the integrated pixel values of the partial regions under the illuminations of the first irradiation light and the second irradiation light is about 4.

In FIG. 12, the integrated pixel value graph 305 and the integrated pixel value graph 306 show the integrated pixel value within the local window in the image layer data corresponding to the NIR3 filter. The integrated pixel value graph 305 shows the integrated pixel value of the first image layer data. On the other hand, the integrated pixel value graph 306 shows the integrated pixel value of the second image layer data.

The integrated pixel value of the integrated pixel value graph 305 represents about 12. The integrated pixel value of the integrated pixel value graph 306 represents about 11. Therefore, the difference between the integrated pixel values of the partial regions under the illuminations of the first irradiation light and the second irradiation light is about 1.

According to the integrated pixel value graphs 301 to 306 shown in FIG. 12, in the image layer data corresponding to NIR2, the difference between the integrated pixel values under the illuminations of the first irradiation light and the second irradiation light is larger as compared to the other bandpass filters. This shows that the absorption amount varies in the transmission wavelength band of NIR2, that is, a region in which the variation gradient of the reflection spectrum of the target object is large is included. As described by using FIG. 11(a) and Fig. (b), in the present embodiment, the image processing unit 205 sequentially computes the integrated pixel values while causing the local window to scan on the respective image regions of the first image layer data and the second image layer data. Then, difference information showing the difference value of the integrated pixel values of the same positions on the images between the first image layer data and the second image layer data is generated as the spectrum information of the subject.

Figure 13A:
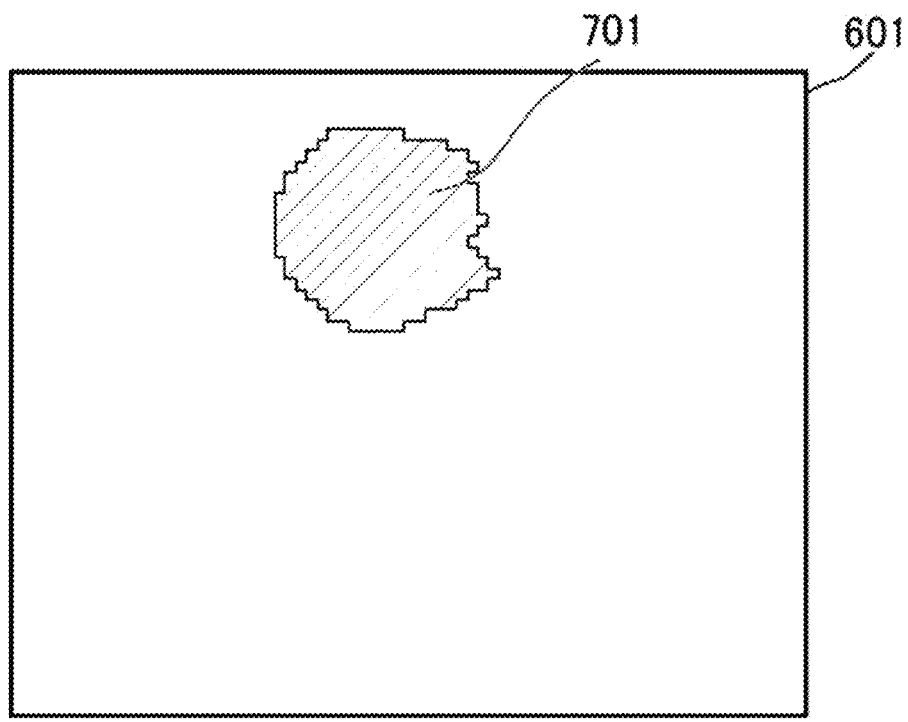
FIG. 13(a), FIG. 13(b), and FIG. 13(c) are drawings respectively showing the specified regions extracted in the image layer data of each bandpass filter.
Figure 13B:
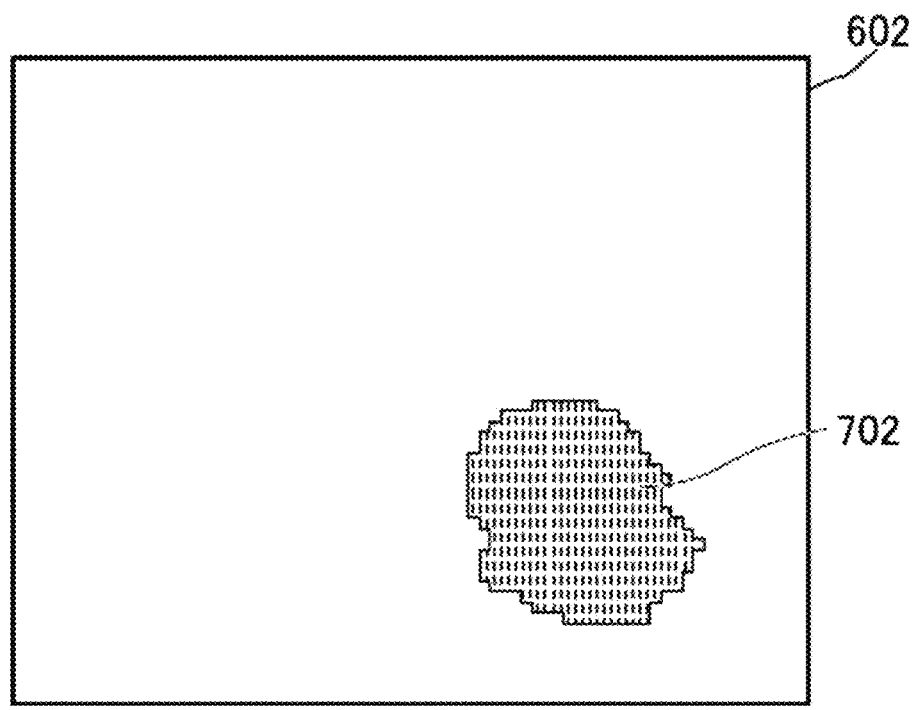
Figure 13C:
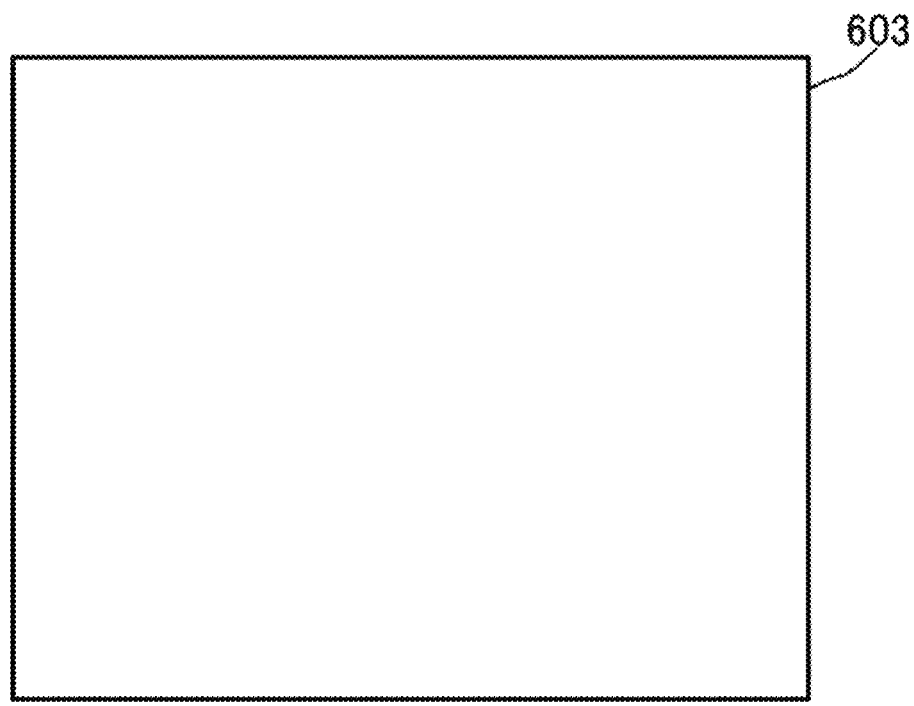

FIG. 13(a), FIG. 13(b), and FIG. 13(c) are the drawings respectively showing the extracted specified region in the image layer data of each bandpass filter. The image processing unit 205 specifies the specified regions as the followings. Note that similar to the description in FIG. 11(a) and FIG. 11(b), the process on the image layer data corresponding to NIR2 is described as an example.

The image processing unit 205 reads the stored the detection coordinate and the data of the integrated pixel values from the system memory 206, and calculates the difference of the integrated pixel values in the same detection coordinate between the first image layer data 402 and the second image layer data 502. Then, if the calculated difference exceeds a predetermined threshold, the image processing unit 205 extracts the detection coordinate as a feature point. The image processing unit 205 associates the extracted detection coordinates as the feature points with the identifiers of the bandpass filters, and stores the detection coordinates in the system memory 206. Then, the image processing unit 205 specifies, among the extracted detection coordinates as the feature points, regions of the local window corresponding to the detection coordinates in which the calculated differences are substantially the same, as the specified regions. Note that that the calculated differences are substantially the same includes a case where a slight difference due to noises, measurement errors, or the like occurs. In the descriptions below, the detection coordinates in which the calculated differences are substantially the same may be referred to as specified coordinates. Note that the image processing unit 205 also performs a similar process on the image layer data corresponding to NIR1 and NIR3.

FIG. 13(a) shows difference image data 601. The difference image data 601 is two-dimensional array data in which the difference of the integrated pixel values between the first image layer data 401 and the second image layer data 501 is calculated on the respectively corresponding detection coordinates and is arrayed corresponding to the detection coordinate position. Also, in FIG. 13(a), a specified region 701 is shown. The specified region 701 is a region in which a logical sum of the respective local window regions is taken when the local window is arranged around the respective extracted specified coordinates.

FIG. 13(b) shows difference image data 602. The difference image data 602 is a two-dimensional array data in which the difference of the integrated pixel values between the first image layer data 402 and the second image layer data 502 is calculated on the respectively corresponding detection coordinates and is arrayed corresponding to the detection coordinate position. Also, in FIG. 13(b), a specified region 702 is shown. The specified region 702 is a region in which a logical sum of each local window region is taken when the local window is arranged around each of the extracted specified coordinates.

FIG. 13(c) shows difference image data 603. The difference image data 603 is a two-dimensional array data in which the difference of the integrated pixel values between the first image layer data 403 and the second image layer data 503 is calculated on the respectively corresponding detection coordinate and is arrayed corresponding to the detection coordinate position.

Referring to FIG. 13(a) to FIG. 13(c), as described by using FIG. 12, the specified region 701 shows an existence region of a substance having a relatively large spectrum variation in the transmission wavelength band (between 1170 nm and 1450 nm) of NIR1. Also, the specified region 702 shows an existence region of a substance having a relatively large spectrum variation in the transmission wavelength band (between 1270 nm and 1550 nm) of NIR2.

Figure 14:
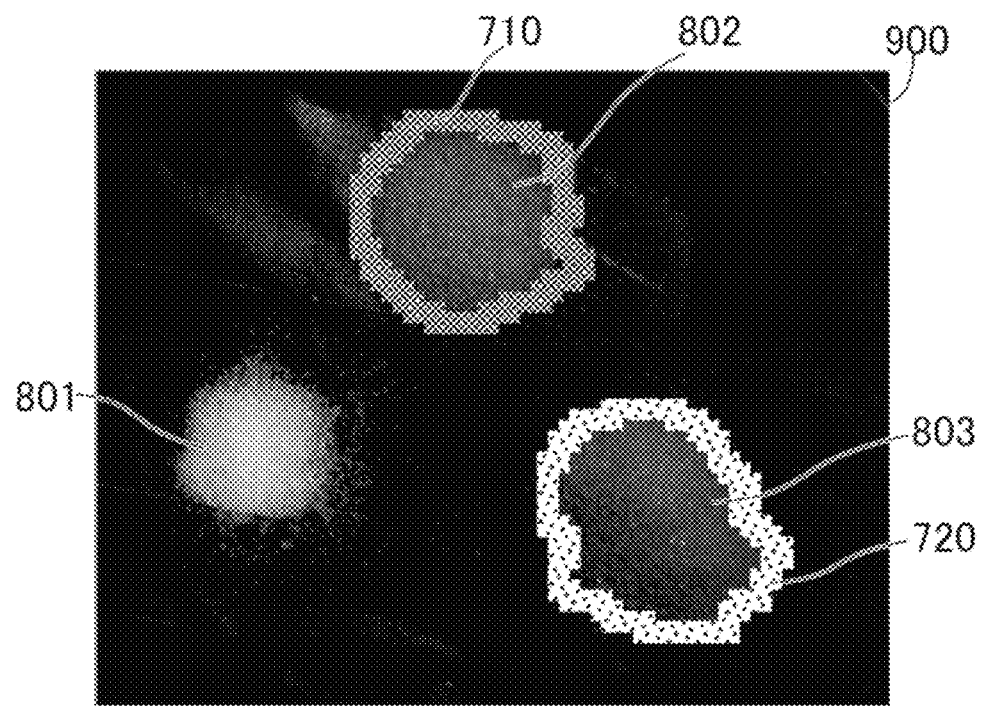
FIG. 14 is a drawing showing one example of an output image in which an effect processing is performed on the extracted specified regions.

FIG. 14 is a drawing showing one example of an output image on which the effect processing is performed on the extracted specified region. Particularly, an output image 900 is shown, on which the contour emphasis process has been performed on the specified region extracted by the process described by using FIG. 10(a) to FIG. 13(c).

In the output image 900, the region 801 being the image region of "salt", the region 802 being the image region of "synthetic sweetener", and the region 803 being the image region of "sugar" are shown. Also, a contour 710 is displayed superposingly on the region 802, and a contour 720 is displayed superposingly on the region 803.

The contour 710 corresponds to the specified region extracted from the image layer data corresponding to NIR1. Also, the contour 720 corresponds to the specified region extracted from the image layer data corresponding to NIR2. As shown in FIG. 14, in the present embodiment, in order to clearly show the bandpass filter by which the specified region is extracted, the effect processing has been performed so that the contour 710 and the contour 720 have different color phases from each other. For example, the contour 710 is displayed in blue, and the contour 720 is displayed in red.

In the present embodiment, it can be grasped the wavelength region in which the spectrum of the subject varies among the NIR1 filter to the NIR3 filter. For this reason, by performing the effect processing so as to allocate a specified color on a specified substance, the image region of the substance can be discriminated by colors. Accordingly, a substance having a known absorption band in the near-infrared band can be visually specified.

As described above, the digital camera 10 in the present embodiment can grasp, by using the three types of the bandpass filters having relatively wide transmission wavelength bands, the wavelength band in which the spectrum characteristic of the reflectivity of the image-capturing target object abruptly varies from the captured image data by irradiating the two types of illuminations having the phases that are different from each other. In other words, the digital camera 10 separates the intensity information of the light multiplexed over the transmission wavelength bands by irradiating the two irradiation light beams that mask parts of the wavelength bands, which are different from each other, of the transmission wavelength bands of the bandpass filters.

Also, by performing the effect processing such as the color emphasis, contour emphasis, or the like, on the image regions corresponding to the specified regions extracted from the first image layer data and the second image layer data, and the discriminability of a finally generated visible image can be improved.

Figure 15:
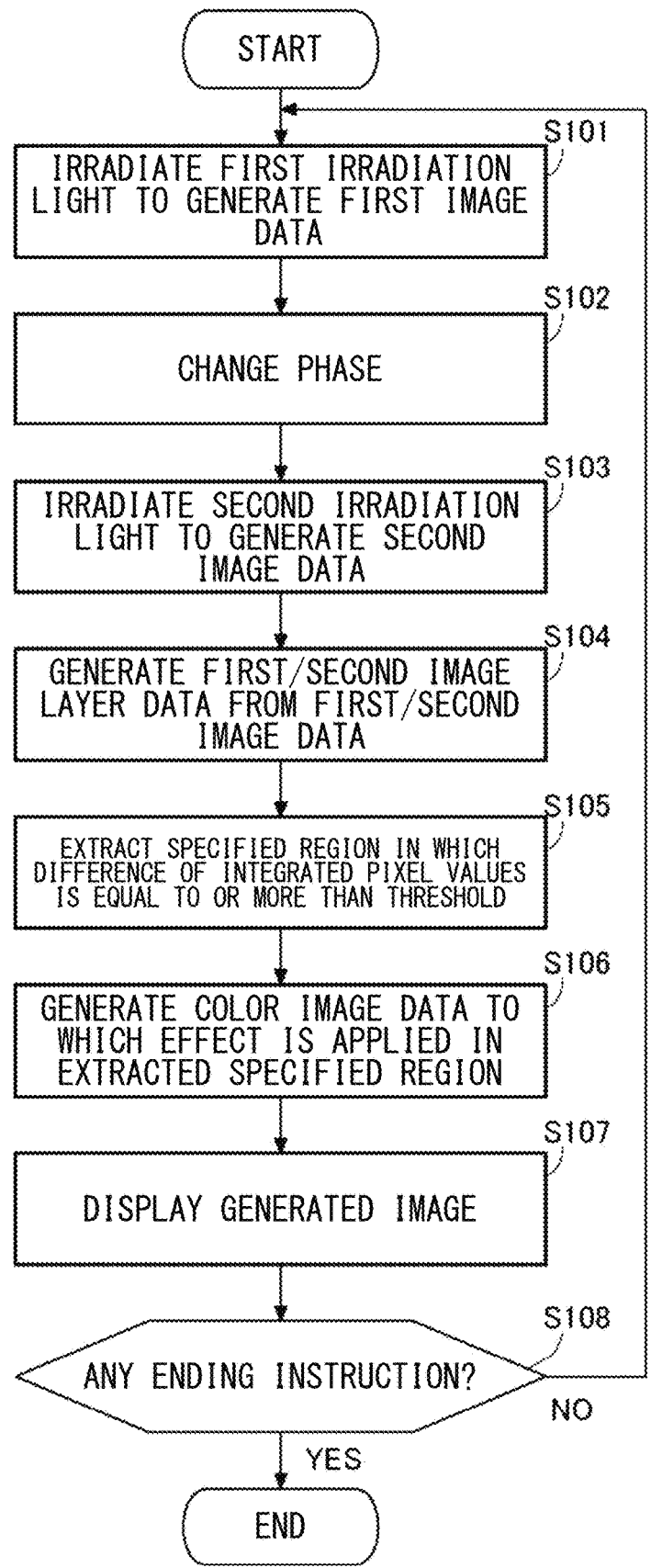
FIG. 15 is a flow chart showing a processing procedure in a digital camera 10.

FIG. 15 is a flow chart showing a processing procedure in the digital camera 10. A program shown in the present flow is stored in the system memory 206 and is implemented by executing the program called by the control unit 201. The present flow starts at a time point, for example, when the power of the digital camera 10 is turned on and the digital camera 10 becomes in a state where imaging is possible. In the following description of the present flow, any one of elements configuring the digital camera 10 operates according to the control by the control unit 201.

If the operating unit 208 detects SW2 of the release switch by the user, according to the control of the control unit 201, the digital camera 10 irradiates the first irradiation light on the subject and generates the first image data of the image of the subject (Step S101). Then, the digital camera 10 stores the first image data in the work memory 203.

Next, according to the control of the control unit 201, the modulating unit 232 modulates the phase of the first irradiation light (Step S102). In the present embodiment, a modulation amount of the phase is $\pi/2$. Then, according to the control of the control unit 201, the digital camera 10 irradiates the second irradiation light on the subject and generates the second image data of the image of the subject (Step S103). Then, the digital camera 10 stores the second image data in the work memory 203.

The image processing unit 205 reads the image capturing data from the work memory 203. The image processing unit 205 generates the first image layer data and the second image layer data corresponding to each bandpass filter from the first image data and the second image data (Step S104). The image processing unit 205 stores the generated image layer data in the work memory 203.

The image processing unit 205 extracts the specified region with the method described by using FIG. 10(a) to FIG. 13(c) from the image layer data generated in Step S104 (Step S105). Then, the information of the extracted specified region is stored in the work memory 203.

The image processing unit 205 generates the visible image data on which the effect processing has been performed on the specified region extracted in Step S105 (Step S106). Specifically, the image processing unit 205 reads the image layer data from the work memory 203. Then, the image layer data is generated by calculating an arithmetic average of each pixel of the first image layer data and of the second image layer data for each bandpass filter. The image processing unit 205 associates the image layer data with the color space in the visible band and generates the visible image data. Specifically, the image processing unit 205 allocates RGB to the image layer data and generates the visible image data. For example, the image processing unit 205 allocates blue (B) to the image layer data corresponding to NIR1, allocates green (G) to the image layer data corresponding to NIR2, and allocates red (R) to the image layer data corresponding to NIR3.

At this time, the effect processing as described by using FIG. 14 is performed on the visible image data. Accordingly, an observer easily discriminates the region in which the spectrum in the near-infrared band varies.

The control unit 201 displays the generated visible image data on the display unit 209 as the visible image through the LCD drive circuit 210 (Step S107). Then, the control unit 201 determines whether or not an imaging ending instruction from the user is made (Step S108). If it is determined that the imaging ending instruction from the user is not made (NO in Step S108, the control unit 201 proceeds to Step S101 and continues the following flow. On the other hand, if it is determined that the imaging ending instruction from the user is made (YES in Step S108), the control unit 201 ends the series of flows.

In the present embodiment, the image capturing device 100 is controlled so that the image capturing processing is performed respectively at the timing when the first irradiation light is irradiated and at the timing when the second irradiation light is irradiated. However, an active control of synchronizing the timings when the first irradiation light and the second irradiation light are respectively irradiated with the timing of the image capturing processing may not be performed. In this case, the image data is continuously taken in the work memory 203 at a predetermined timing. On the other hand, the first irradiation light and the second irradiation light are alternately switched to be irradiated in a predetermined period. Then, if an image capturing operation is received, among the image data taken in last, image data taken at a time point that is overlapped with the irradiation time of the first irradiation light is specified as the first image data. Similarly, image data taken at a time point that is overlapped with the irradiation time of the second irradiation light is specified as the second image data. Note that the respective light emitting time periods of the first irradiation light and the second irradiation light can be specified from the switching period by storing in advance the start time of light emitting. Also, each taking-in time of the image data can be specified from the taking-in period by storing in advance the start time of taking in the image data. For this reason, the image data taken in at the timing when the first irradiation light is irradiated can be specified. Similarly, the image data taken in at the timing when the second irradiation light is irradiated can be specified.

In the present embodiment, although the near infrared wavelength band is described as the example of the invisible wavelength band, a similar process can be applied to other wavelength bands. For example, a similar process may be applied to the ultraviolet wavelength band of the wavelength band between 200 nm and 380 nm. Accordingly, an image having the good color discriminability for the observer also can be generated for an observation target object having an absorption band in the ultraviolet wavelength band.

In the present embodiment, although the digital camera having the three types of the bandpass filters is described as one example, the camera may have four types or more of bandpass filters. In this case, for example, by appropriately selecting the image layer data corresponding to the three types of the bandpass filters and allocating RGB thereto, the visible image data is generated.

In the present embodiment, the example using the multi-band pass filter in which any one of the plurality of bandpass filters is arranged in each pixel of the image capturing device 100 is described. However, the relation between the image capturing device and the bandpass filters is not limited to this. For example, a configuration may be made to include a dynamic mechanism in which no on-chip bandpass filter is provided on each pixel of the image capturing device 100 and any one of the plurality of bandpass filters covers all pixels of the image capturing device 100 in order. In this case, every time when moving the bandpass filters, the first irradiation light and the second irradiation light are irradiated at different light emitting timings to capture images to acquire the first image data and the second image data.

Also, a configuration similar to a known so-called 3CCD system can also be adopted. That is, the same number of image capturing devices as the number of the types of bandpass filters is included to split the subject luminous flux by a plurality of half mirrors or dichroic mirrors. When the dichroic mirror is adopted, no separate bandpass filter is provided on the image capturing device, and the spectrum wavelength characteristic of the dichroic mirror is adjusted to meet the characteristic of the given bandpass filters.

In the present embodiment, although the spectrum in a continuous sine wave shape as the light emission spectrum of the multi-wavelength variable light source 230 is described as one example, the light emission spectrum may be in another waveform, and may be in a waveform such as a rectangular wave, a triangular wave, and a sawtooth wave.

In the present embodiment, although it is described by using the example in which the light-emitting wavelength band of the multi-wavelength variable light source 230 also includes the wavelength band other than the transmission wavelength bands of the bandpass filters, the light-emitting wavelength band may be only in the transmission wavelength bands of the bandpass filters.

In the present embodiment, the spectrum in the continuous sine wave shape as the light emission spectrum of the multi-wavelength variable light source 230, that is, the spectrum having the periodicity with respect to the wavelength is described as one example. However, the spectrum may have no periodicity with respect to the wavelength. For example, the multi-wavelength variable light source 230 may be a light source that emits light while causing pulse-like irradiation light in a relatively narrow light-emitting wavelength band to shift (sweep) over time in the wavelength axial direction. In this case, the configuration is set so as to acquire the image capturing data by synchronizing the sweeping timing.

In the present embodiment, the spectrum having the fixed periodicity with respect to the wavelength in at least parts of the transmission wavelength bands of the bandpass filters, as the light emission spectrum of the multi-wavelength variable light source 230, is described as one example. However, the period may not be fixed. For example, at least parts of the transmission wavelength bands of the bandpass filters may have periodicity that varies. Accordingly, in the partial wavelength band of the transmission wavelength bands, the wavelength resolution to detect the variation of the reflection spectrum in the near-infrared band of the subject can be partially adjusted.

In the present embodiment, the visible image data is generated by using the first image data and the second image data obtained by irradiating the first irradiation light and the second irradiation light. However, the generation of the visible image data may be performed by using the image data obtained by separately irradiating a third irradiation light having another light emission spectrum to capture the image. In this case, during a single image capturing operation, it is controlled so as to perform the image capturing processing by respectively switching the first irradiation light, the second irradiation light, and the third irradiation light. As the light emission spectrum of the third irradiation light, for example, white light and the like having no periodicity in each of the transmission wavelength bands of the wavelength band filters may be adopted. Then, the visible image data may be generated by associating the third output value obtained by capturing the image of the light from the subject corresponding to the third irradiation light with the color space in the visible band as described above. Accordingly, for the same subject, even if varying the light emission spectrums of the first irradiation light and of the second irradiation light, the visible image data, that is the original image data on which the effect processing is performed, does not vary. For this reason, even if the light emission spectrums of the first irradiation light and of the second irradiation light are adjusted, no variation occurs in the appearance of the region other than the specified region being the discrimination target.

In the present embodiment, although the digital camera acquiring a still image is described as one example, a configuration may be set so as to generate live view image data from the acquired image capturing data and to display the data as a live view image on a display unit. In this case, for example, if the configuration is set so as to acquire the image capturing data while switching the first irradiation light and the second irradiation light in 60 Hz, the live view image can be displayed as a moving image at a frame rate of 30 fps. Accordingly, the light emission spectrum of the multi-wavelength variable light source 230 can be adjusted in real time while checking the live view image.

In the present embodiment, as one example of the configuration of the digital camera, the configuration in which the emission axis of the irradiation light of the multi-wavelength variable light source 230 is different from an optical axis 21 of the image-capturing lens 20 is used for description. However, if the image capturing apparatus according to the present invention is applied to an endoscope used for laparoscopic surgery and the like, the configuration may be set to arrange a half mirror and the like on the optical axis 21 and to share parts of the optical axis. By configuring in this way, a diameter of the endoscope can be made small.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . digital camera; 20 . . . image-capturing lens; 21 . . . optical axis; 100 . . . image capturing device; 101 . . . 4-pixel unit; 201 . . . control unit; 202 . . . A/D conversion circuit; 203 . . . work memory; 204 . . . drive unit; 205 . . . image processing unit; 206 . . . system memory; 207 . . . memory card IF; 208 . . . operating unit; 209 . . . display unit; 210 . . . LCD drive circuit; 211 . . . communicating unit; 220 . . . memory card; 230 . . . multi-wavelength variable light source; 232 . . . modulating unit; 234 . . . light-emitting unit; 301 . . . integrated pixel value graph; 302 . . . integrated pixel value graph; 303 . . . integrated pixel value graph; 304 . . . integrated pixel value graph; 305 . . . integrated pixel value graph; 306 . . . integrated pixel value graph; 401 . . . first image layer data; 402 . . . first image layer data; 403 . . . first image layer data; 411 . . . center pixel; 412 . . . local window; 501 . . . second image layer data; 502 . . . second image layer data; 503 . . . second image layer data; 511 . . . center pixel; 512 . . . local window; 601 . . . difference image data; 602 . . . difference image data; 603 . . . difference image data; 701 . . . specified region; 702 . . . specified region; 710 . . . contour; 720 . . . contour; 801 . . . region; 802 . . . region; 803 . . . region; 900 . . . output image

What is claimed is:

1. An image capturing apparatus, comprising:
a plurality of bandpass filters having invisible wavelengths as passbands, in which parts of the passbands of bandpass filters whose center wavelengths are closest to each other mutually overlap;
an image sensor to capture light from a subject, the light passing through each of the plurality of bandpass filters;
at least one light source to irradiate a first irradiation light and a second irradiation light on the subject; and
a controller configured
to control the image sensor to capture a first image of the light from the subject on which the first irradiation light is irradiated, the first irradiation light having a first spectral distribution in which parts of the respective passbands of the plurality of bandpass filters overlap with one another, and
to control the image sensor to capture a second image of the light from the subject on which the second irradiation light is irradiated, the second irradiation light having a second spectral distribution which is different from the first spectral distribution and in which parts of the respective passbands of the plurality of bandpass filters overlap with one another,
wherein the first spectral distribution and the second spectral distribution are distributions that have no intensity in at least parts of the respective passbands of the plurality of bandpass filters.

2. The image capturing apparatus according to claim 1, wherein the controller is further configured to:
generate information related to a spectrum feature amount of the subject based on a first output value from the image sensor captured by the first irradiation light and a second output value from the image sensor captured by the second irradiation light.

3. The image capturing apparatus according to claim 2, wherein
the generated information includes a difference between the first output value and the second output value.

4. The image capturing apparatus according to claim 2, wherein the controller is further configured to:
specify, in a captured image of the subject, specified regions in which the spectrum feature amounts are substantially the same as each other.

5. The image capturing apparatus according to claim 4, wherein
the controller controls the image sensor to capture a third image of the light from the subject on which a third irradiation light is irradiated, the third irradiation light having a spectral distribution that has no periodicity in the respective passbands of the plurality of bandpass filters, and
the image capturing apparatus comprises an image generator to generate emphasized image data that emphasizes the specified regions with respect to visible image data generated by associating, with a color space in a visible band, a third output value from the image sensor captured by the third irradiation light passing through each of the plurality of bandpass filters.

6. The image capturing apparatus according to claim 1, wherein
the first spectral distribution and the second spectral distribution have periodicity in at least parts of the passbands, and
the first spectral distribution and the second spectral distribution are distributions that have phases different from each other in the periodicity.

7. The image capturing apparatus according to claim 1, wherein
the first spectral distribution and the second spectral distribution are distributions that have periodicity that varies in at least parts of the passbands.

8. The image capturing apparatus according to claim 6, wherein
the controller adjusts at least one of a phase, a period, and intensity in the periodicity with respect to at least one of the first spectral distribution and the second spectral distribution.

9. The image capturing apparatus according to claim 1, wherein
the controller switches the first irradiation light and the second irradiation light to irradiate.

10. A non-transitory image capturing computer program product having computer instructions, recorded on a computer readable medium, that, when executed by an image capturing apparatus comprising an image sensor that captures an image of light from a subject, the light passing through each of a plurality of bandpass filters having invisible wavelengths as passbands, in which parts of the passbands of filters whose center wavelengths are closest to each other mutually overlap, control the image capturing apparatus to execute the computer instructions to perform operations comprising:
controlling the image sensor to capture a first image of the light from the subject on which a first irradiation light is irradiated, the first irradiation light having a first spectral distribution in which parts of the respective passbands of the plurality of bandpass filters overlap with one another; and
controlling the image sensor to capture a second image of the light from the subject on which a second irradiation light is irradiated, the second irradiation light having a second spectral distribution which is different from the first spectral distribution and in which parts of the respective passbands of the plurality of bandpass filters overlap with one another, wherein
the first spectral distribution and the second spectral distribution are distributions that have no intensity in at least parts of the respective passbands of the plurality of bandpass filters.

11. An image capturing method of an image capturing apparatus comprising an image sensor to capture an image of light from a subject, the light passing through each of a plurality of bandpass filters having invisible wavelengths as passbands, in which parts of the passbands of filters whose center wavelengths are closest to each other mutually overlap, the image capturing method comprising:
controlling the image sensor to capture an image of the light from the subject on which a first irradiation light is irradiated, the first irradiation light having a first spectral distribution in which parts of the respective passbands of the plurality of bandpass filters overlap with one another; and
controlling the image sensor to capture an image of the light from the subject on which a second irradiation light is irradiated, the second irradiation light having a second spectral distribution which is different from the first spectral distribution and in which parts of the respective passbands of the plurality of bandpass filters overlap with one another, wherein
the first spectral distribution and the second spectral distribution are distributions that have no intensity in at least parts of the respective passbands of the plurality of bandpass filters.

12. An image capturing apparatus, comprising:
a plurality of bandpass filters having invisible wavelengths as passbands, in which parts of the passbands of bandpass filters whose center wavelengths are closest to each other mutually overlap;
an image sensor to capture light from a subject, the light passing through each of the plurality of bandpass filters; and
a controller configured
to control the image sensor to capture a first image of the light from the subject on which a first irradiation light is irradiated, the first irradiation light having a first spectral distribution in which parts of the respective passbands of the plurality of bandpass filters overlap with one another, and
to control the image sensor to capture a second image of the light from the subject on which a second irradiation light is irradiated, the second irradiation light having a second spectral distribution which is different from the first spectral distribution and in which parts of the respective passbands of the plurality of bandpass filters overlap with one another,
wherein the first spectral distribution and the second spectral distribution are distributions that have no intensity in at least parts of the respective passbands of the plurality of bandpass filters, and
wherein the controller is further configured to:
generate information related to a spectrum feature amount of the subject based on a first output value from the image sensor captured by the first irradiation light and a second output value from the image sensor captured by the second irradiation light.

* * * * *